United States Patent [19]

Satoh et al.

[11] Patent Number: 5,021,818
[45] Date of Patent: Jun. 4, 1991

[54] MULTI-AREA BRIGHTNESS MEASURING APPARATUS

[75] Inventors: Osamu Satoh; Isamu Hirai; Masahiro Nakata, all of Tokyo, Japan

[73] Assignee: Asahi Kogaku Kogyo Kabushiki Kaisha, Tokyo, Japan

[21] Appl. No.: 376,623

[22] Filed: Jul. 7, 1989

[30] Foreign Application Priority Data

Jul. 8, 1988 [JP] Japan ................. 63-170568

[51] Int. Cl.$^5$ ............................... G03B 7/08
[52] U.S. Cl. .................... 354/429; 354/414
[58] Field of Search ............... 354/429, 432, 433, 434, 354/414

[56] References Cited

U.S. PATENT DOCUMENTS

| 3,394,078 | 7/1982 | Terashita . |
| 4,322,142 | 3/1982 | Kawamura et al. . |
| 4,364,650 | 12/1982 | Terashita et al. . |
| 4,391,500 | 7/1983 | Tsunekawa . |
| 4,395,099 | 7/1983 | Terasita . |
| 4,809,031 | 2/1989 | Sakaguchi et al. ............ 354/429 |

FOREIGN PATENT DOCUMENTS

| 0103701 | 7/1983 | European Pat. Off. . |
| 62-62228 | 3/1987 | Japan . |
| 62-62229 | 3/1987 | Japan . |
| 62-62230 | 3/1987 | Japan . |
| 62-62231 | 3/1987 | Japan . |
| 62-203140 | 9/1987 | Japan . |
| 62-203141 | 9/1987 | Japan . |
| 62-203142 | 9/1987 | Japan . |
| 63-7330 | 2/1988 | Japan . |
| 63-132224 | 6/1988 | Japan . |
| 63-7331 | 2/1989 | Japan . |
| 2125979 | 8/1982 | United Kingdom . |

OTHER PUBLICATIONS

Kyocera 230-AF.
Nikon AF401.
Canon EOS 650/620.
Nikon FA.

Primary Examiner—Russell E. Adams
Attorney, Agent, or Firm—Sandler, Greenblum & Bernstein

[57] ABSTRACT

A multi-area brightness measuring apparatus for a camera, which measures the brightness of an object in a center area of a photographing area and a circumferential area surrounding the center area to detect whether the object in the center area is in follow light state or in back light state in order to correct the exposure value. The exposure also can be controlled in accordance with the magnification, i.e. in accordance with the surface area of a main object occupying the center area.

44 Claims, 22 Drawing Sheets

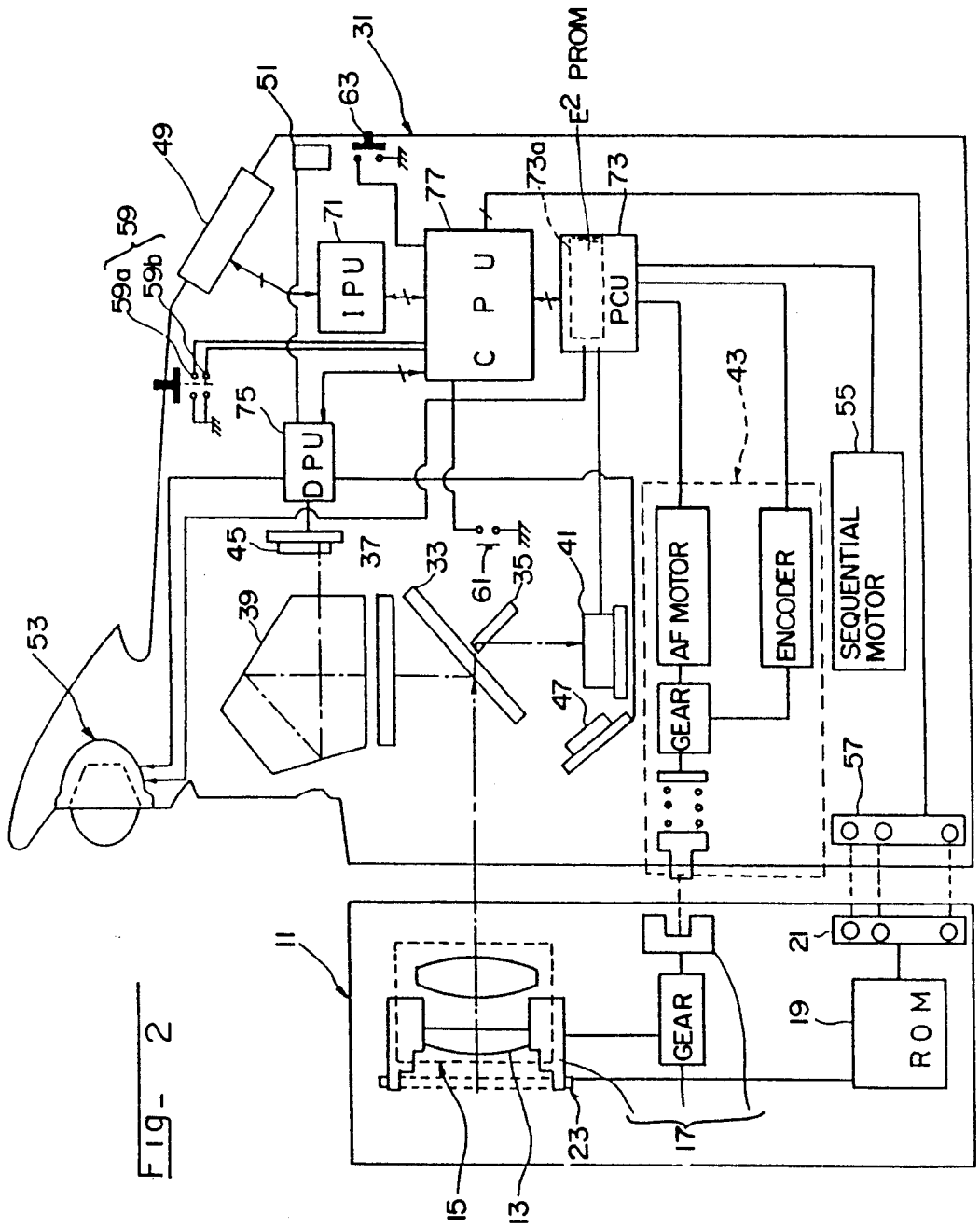

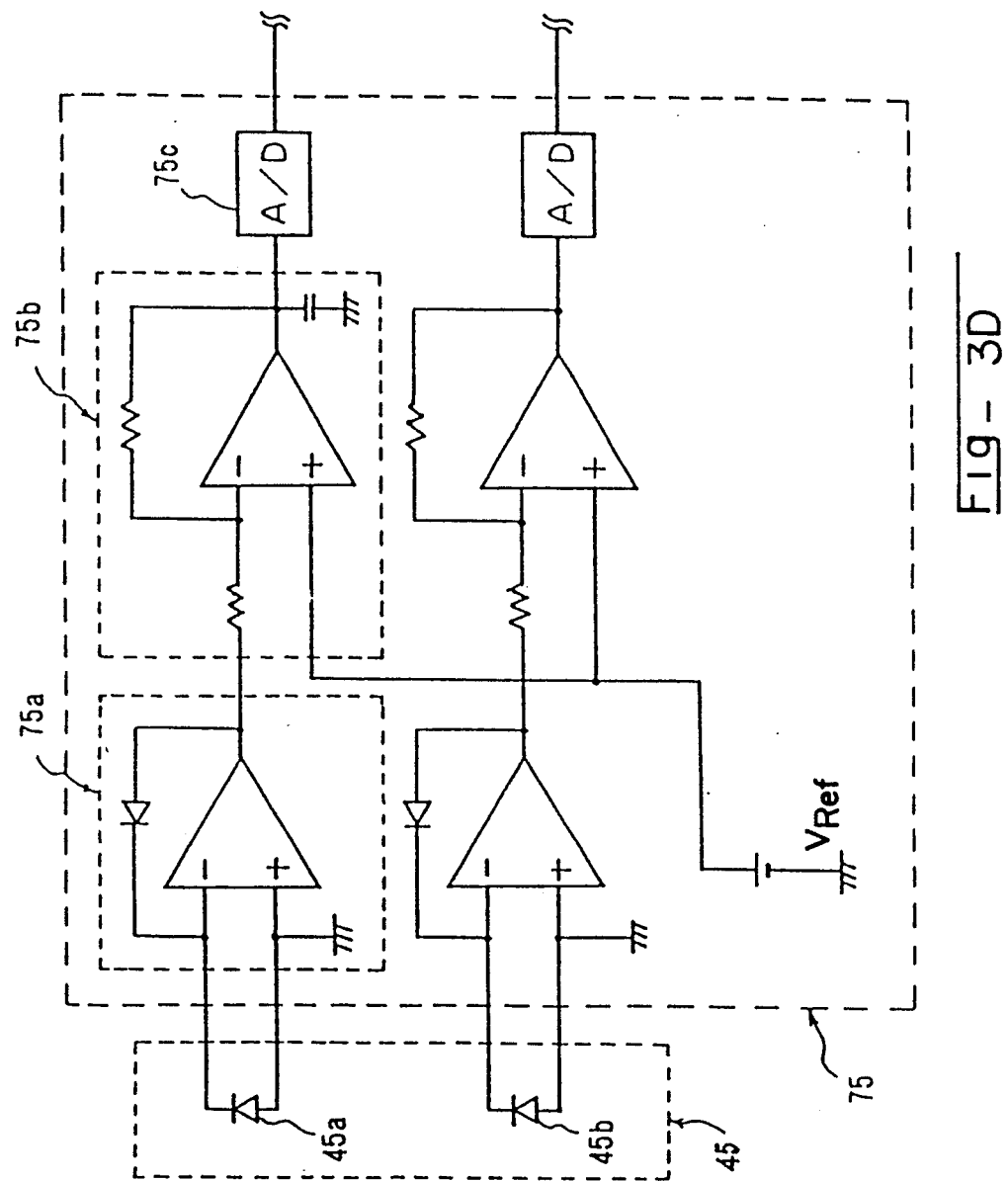

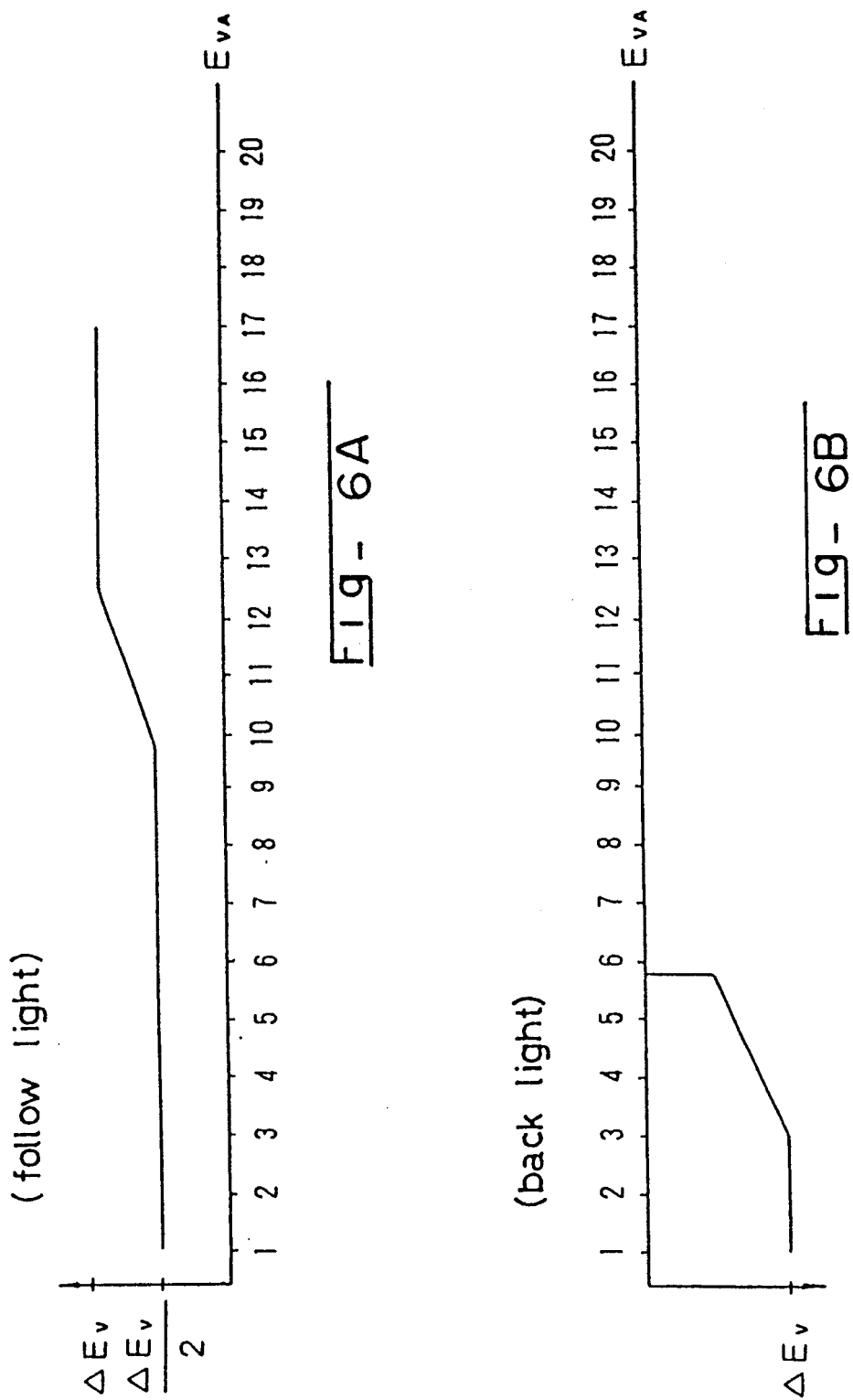

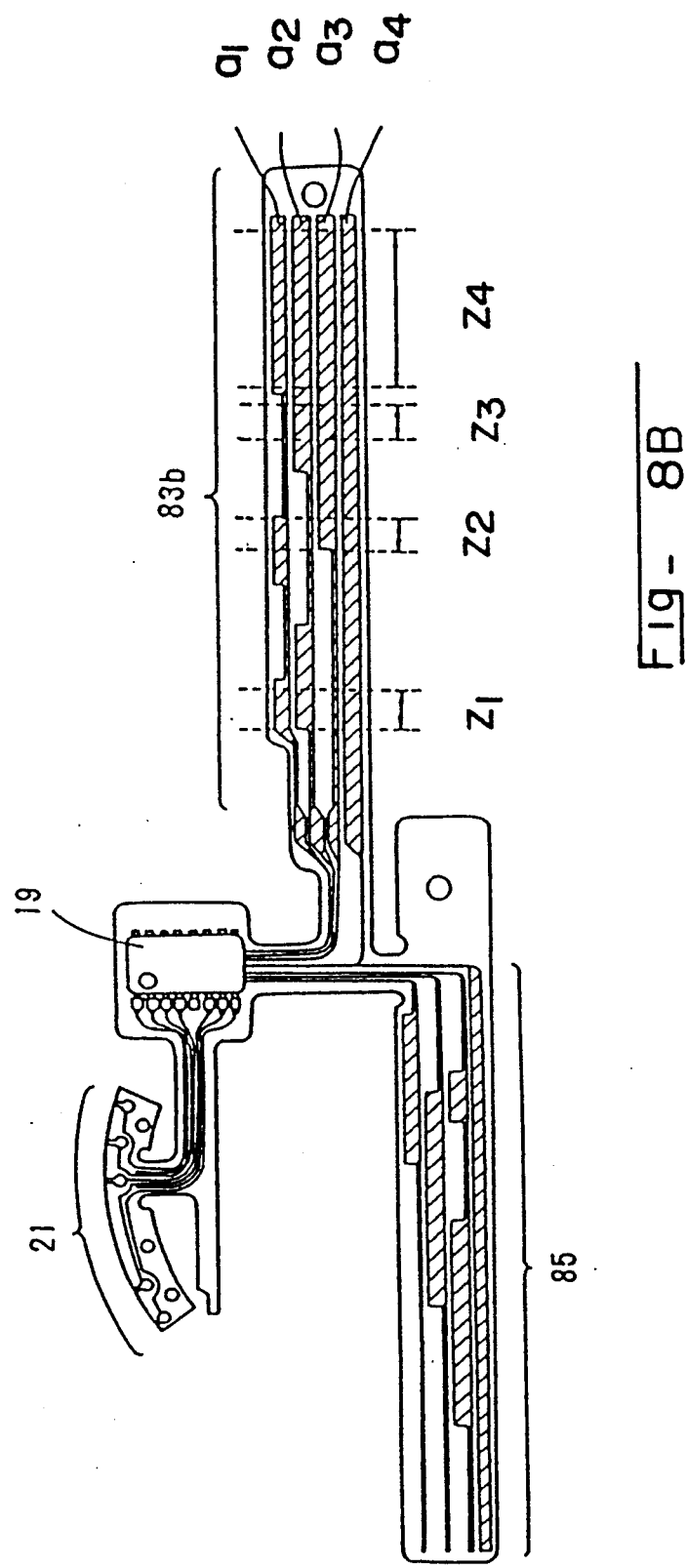

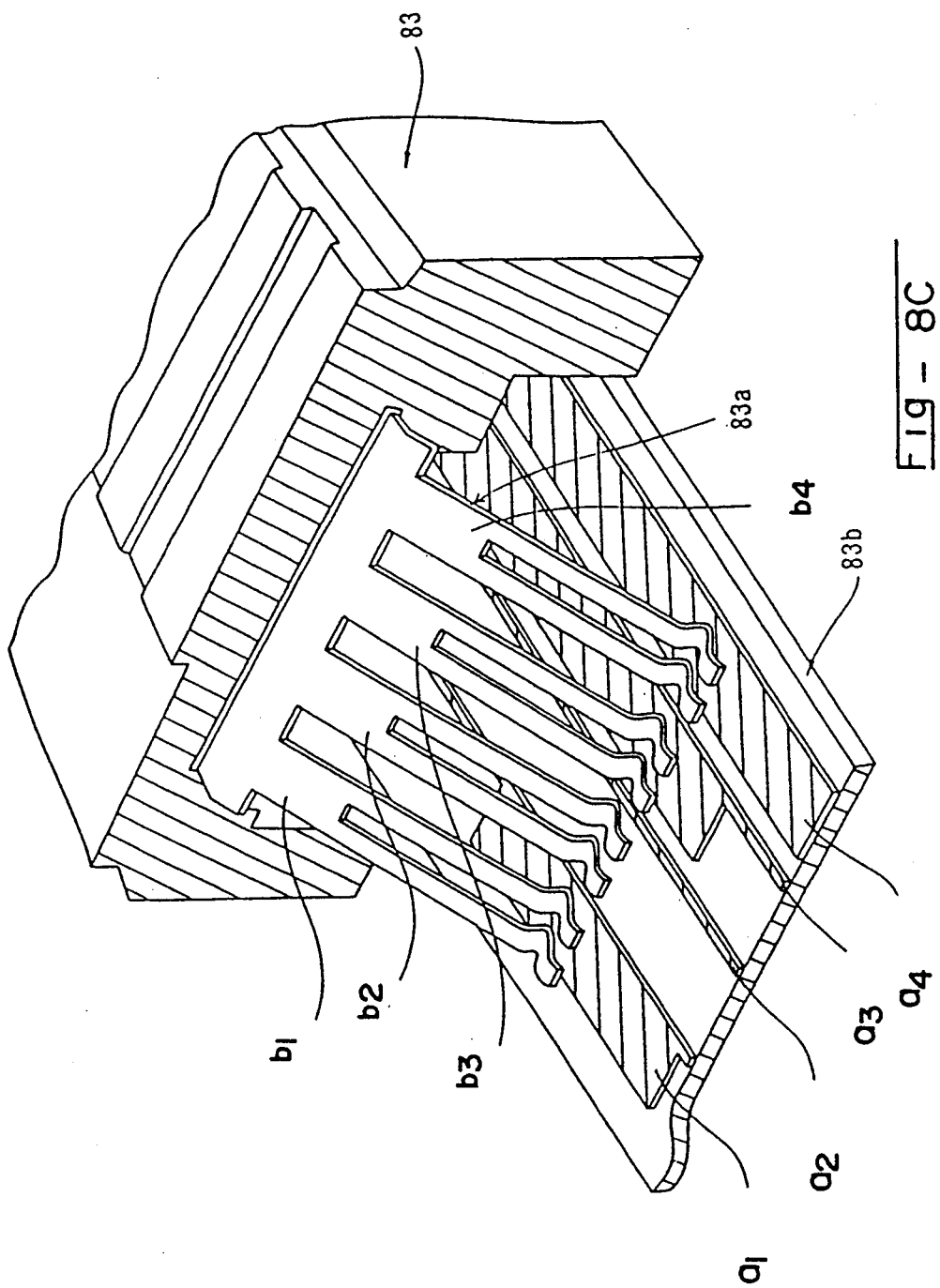

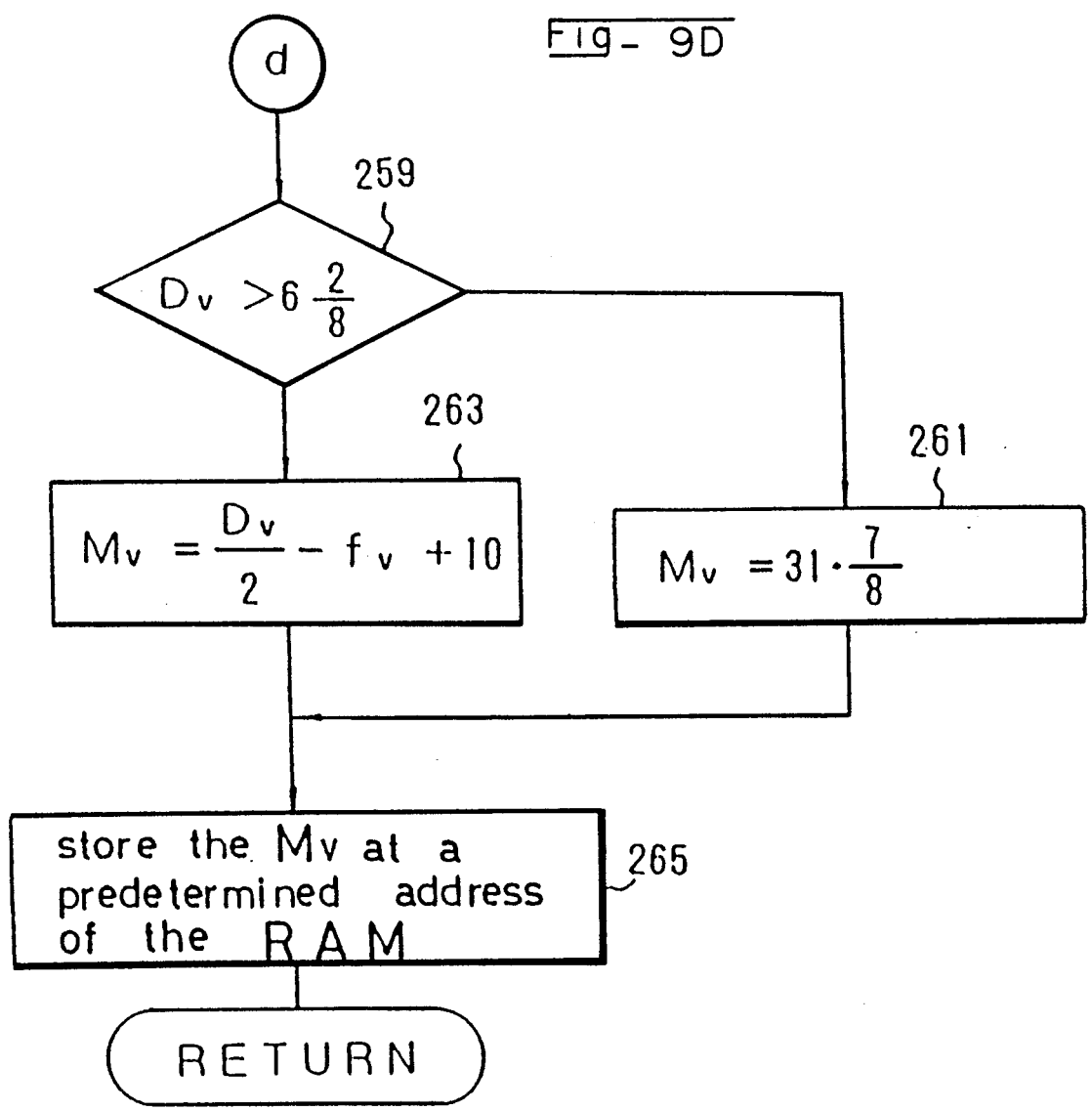

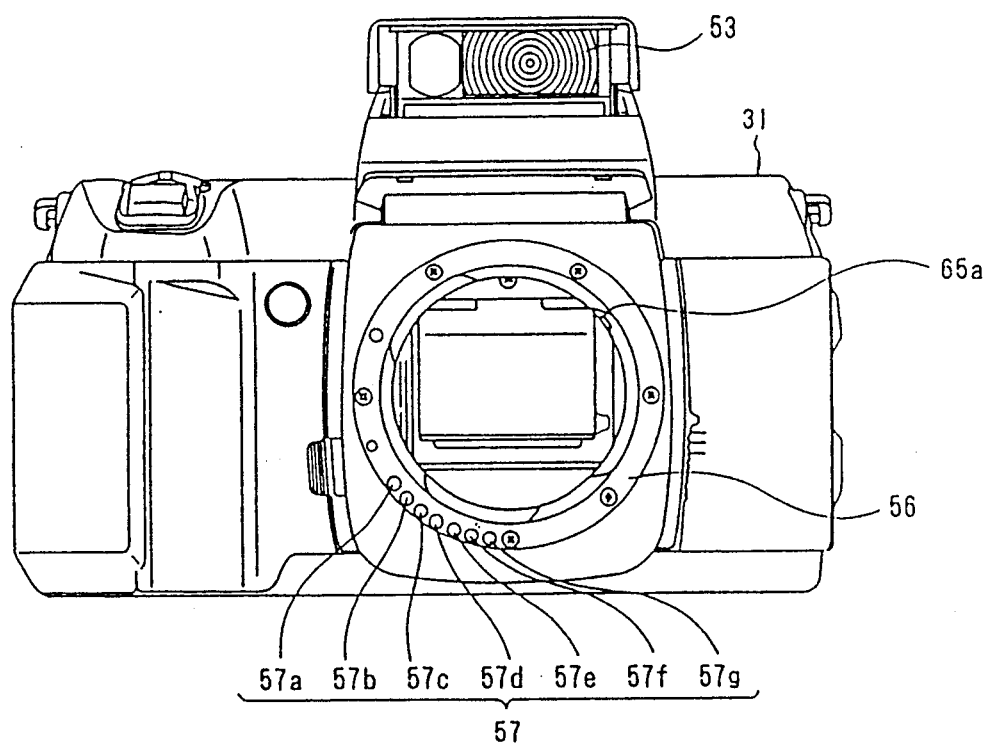
Fig_11A

MULTI-AREA BRIGHTNESS MEASURING APPARATUS

BACKGROUND OF THE INVENTION

1. FIELD OF THE INVENTION

The present invention relates to a multi-area(section) brightness measuring apparatus for obtaining an optimum exposure value for an automatic exposure control.

2. DESCRIPTION OF RELATED ART

An automatic exposure control device, which enables a photographer to easily take a picture, is incorporated in almost all of conventional cameras. The exposure can be automatically determined by a combination of an aperture and a shutter speed related to the luminance of an object to be photographed. It is necessary to detect an optimum exposure value (Ev) depending on a luminance of an object in order to effect such an automatic exposure control. At this end, a conventional camera usually has a brightness measuring device (photometer) which is a reflected-light exposure meter. However, the exposure value detected by the reflected-light exposure meter largely depends on a reflectance of the object and a measuring area of the object to be metered etc. Namely, in case of an object including a light sky or a white background, an exposure of a main object is an under-exposure. In particular, an extreme back light leads to an intensive under-exposure. On the other hand, in case of an object including a black or dark background, an exposure of the main object is an over-exposure.

The solution to the drawbacks mentioned above is disclosed for example in Japanese Unexamined Patent Publication (Kokai) No. 62-203141 in which an exposure meter has a brightness measuring means which has, at a center portion of a picture plane, a center brightness measuring area including a center of a picture plane and a plurality of adjacent brightness measuring areas including a plurality of concentrically divided adjacent areas provided on the circumference of the center brightness measuring area. When the size of an image of the main objects in the center brightness measuring area is detected by a magnification of the image calculated by detected object distance and focal length information of the taking lens, an exposure correcting value is determined in accordance with a relationship of brightness between the main object and the background, obtained by the output signals of the center brightness measuring area and the adjacent brightness measuring areas concentrically located in respect to the center brightness measuring area, so that the exposure correcting value thus obtained is added to a center weighted averaged overall light reading value which is obtained by the outputs of the center and adjacent brightness measuring areas to determine an optimum exposure value.

In the multi-area brightness measuring apparatus mentioned above, it is possible to suppose a brightness measuring area to which the object corresponds to obtain the exposure correcting value based on an inclination of the brightness of the brightness measuring areas corresponding to the object, thus resulting in an optimum exposure value.

However, the provision of a plurality of brightness measuring areas makes the known exposure meter complex. Furthermore, the known exposure meter must perform the complicated detection and calculation processes of the center weighted averaged overall light reading value because it has many brightness measuring areas and sensors therein. In addition, since the exposure correcting value is detected on the basis of the relationship of brightness of the image of the main object and the background only when the size of the image of the main object corresponds to the center brightness measuring area, the exposure value can not be corrected when the size of the image of the main object does not correspond to the center brightness measuring area.

SUMMARY OF THE INVENTION

The primary object of the present invention is therefore to provide a single multi-area brightness measuring apparatus which eliminates the above-mentioned drawbacks of the reflected-light exposure meter of the prior art, and in which arithmetic processes can be simplified.

To achieve the object mentioned above, according to the present invention, there is provided only two brightness measuring sensors, one of which detects a brightness of a center area of a photographing area and the other detects a brightness of a circumferential area surrounding the center area. The present invention enables a simple detection and calculation processes to obtain exposure correcting value because there are only two brightness measuring sensors.

According to another aspect of the present invention, there is provided a multi-area brightness measuring apparatus, wherein the improvement comprises a first brightness measuring sensor which detects a brightness of a center area of a photographing area; a second brightness measuring sensor which detects a brightness of a circumferential area surrounding the center area; detecting means for detecting whether the object in the center area is in follow light (front light) state or back light (rear light) state, based on the outputs of the first and second brightness measuring sensors; first brightness information determining means which operates when the detecting means detects the follow light state to generate an output of a brightness value which is obtained by subtracting a predetermined follow light correcting value corresponding to a brightness value obtained by the output of the first brightness measuring sensor from the brightness value obtained by the output of the first brightness measuring sensor; and second brightness information determining means which operates when the detecting means detects the back light state and when a brightness value obtained by the output of the first brightness measuring sensor is below a first predetermined reference brightness value to generate an output of a brightness value which is obtained by adding a predetermined back light correcting value corresponding to the brightness value obtained by the output of the first brightness measuring sensor to the brightness value obtained by the output of the first brightness measuring sensor.

According to still another aspect of the present invention, there is provided a multi-area brightness measuring apparatus, wherein the improvement comprises a first brightness measuring sensor which detects a brightness of a center area photographing area; a second brightness measuring sensor which detects a brightness of a circumferential area surrounding the center area; detecting means for detecting whether the object in the center area is in follow light state of back light state, based on the outputs of the first and second brightness measuring sensors; and brightness information determining means which operates when the detecting means detects the back light state and which corrects the outputs of the first brightness measuring sensor and the second brightness measuring sensor in accordance with a magnification which is obtained by the focal length of a photographing lens and an object distance of the object in said center area.

BRIEF DESCRIPTION OF THE DRAWINGS

The invention will be described below in detail with reference to the accompanying drawings, in which:

FIG. 2 is a block diagram of a camera to which a divided brightness measuring apparatus according to the present invention;

FIG. 3D is a diagram of a circuit for processing the output current of a light receiving element shown in FIGS. 3A to 3C;

FIGS. 6A and 6B are diagrams showing a concept of correction of the exposure of the multi area brightness measuring apparatus according to the present invention;

FIGS. 8A, 8B and 8C are partially broken perspective view, sectional view and partially broken perspective view of a mechanism for detecting the focal length of a photographing lens and an object distance, respectively;

FIGS. 9A, 9B, 9C and 9D are flow charts of CPU for operating a magnification detecting means;

DESCRIPTION OF PREFERRED EMBODIMENTS

Figure 1A:
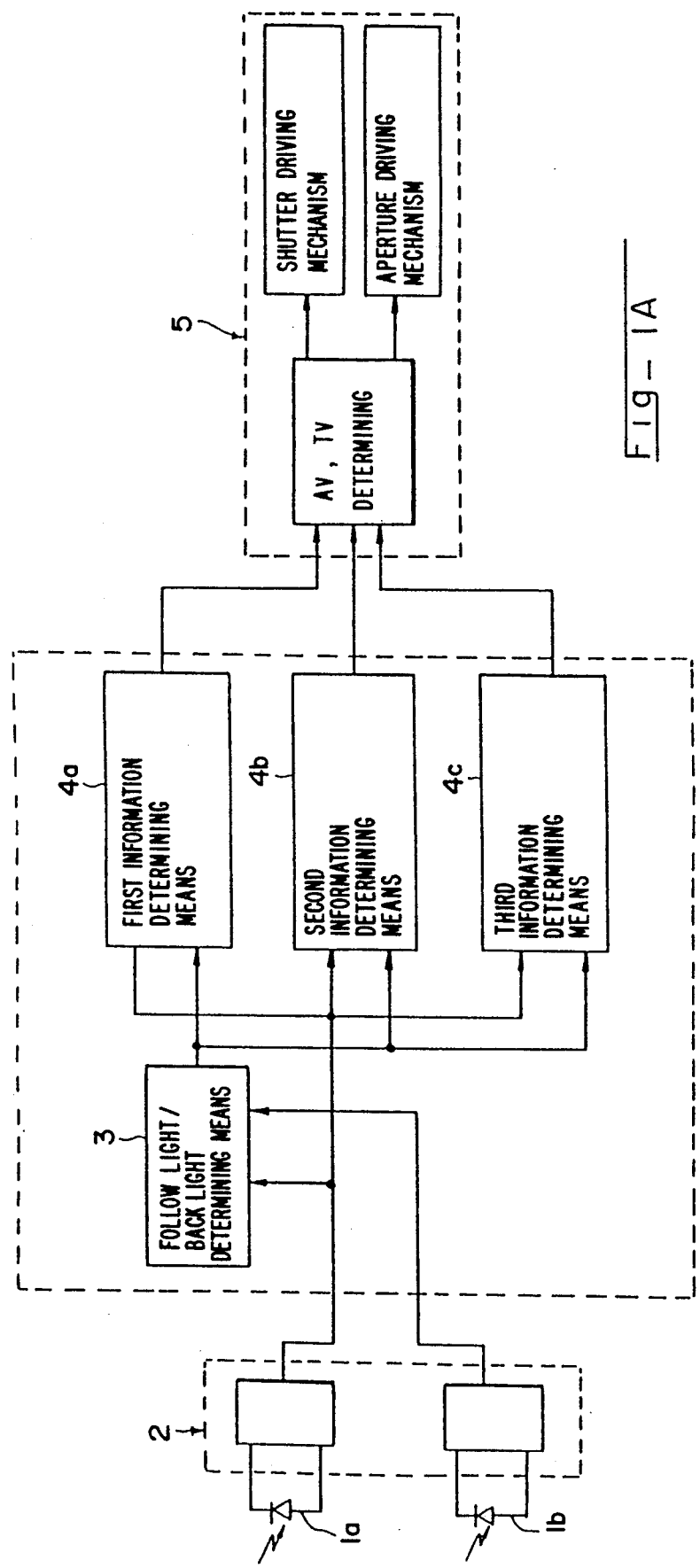
FIG. 1A is a block diagram showing a main construction of a multi-area brightness measuring apparatus according to the present invention.

FIG. 1A, which shows a basic concept of the present invention, a multi-area brightness measuring apparatus according to the present invention comprises a first sensor 1a which detects the brightness of a center area of a photographing area, a second sensor 1b which detects the brightness of an adjacent area surrounding the center area in the photographing area, a processing circuit 2 which outputs a brightness value or an exposure value $E_v$ based on the outputs of the sensors 1a and 1b, to subsequent means which will be described below, a determining means 3 for determining whether or not an object to be photographed in the center area is in the state of follow light or back light, a first brightness information determining means 4a which operates at the follow light state to generate a brightness information which is obtained by subtracting a corresponding follow light correcting value from the brightness value of the first sensor 1a, a second brightness information determining means 4b which operates when the brightness value of the first sensor 1a is below a first predetermined brightness value at the back light state to generate a brightness information which is obtained by adding corresponding back light correcting value to the brightness value of the first sensor 1a, and a third brightness information determining means 4c which operates when the brightness value of the first sensor 1a is above a second predetermined brightness value at the back light state and when a magnification which is determined by a focal length of a photographing lens and an object distance is within a predetermined range to generate a brightness information which is obtained by subtracting a corresponding back light correcting value corresponding to the magnification from the brightness value of the first sensor 1a.

Preferably, whether the light is follow light or back light can be judged as follows.

Namely, when the value which is obtained by subtracting the brightness value of the second sensor from the brightness value of the first sensor is above and below a predetermined positive value, the light is judged to be follow light state and back light state, respectively.

The correcting value used in the first brightness information determining means 4a can be properly set, and is preferably, for example, a value equal to half of a difference between the brightness values of the first sensor and the second sensor when the brightness value of the first sensor is low, and the correcting value gradually increases as the brightness value of the first sensor becomes high.

Preferably, the maximum values of the correcting values used in the first and second information determining means 4a and 4b are equal to a difference between the brightness values of the first sensor 1a and the second sensor 1b. When the difference of the brightness values is above a predetermined maximum correcting value, the correcting values are selected to be the predetermined maximum correcting value.

Preferably, the magnification within a predetermined range in the third information determining means 4c includes $x/2^9$, for example when the object is a figure, wherein "x" represents a size (mm) of an image on an image plane in a light receiving area of the first sensor 1a.

Supposing that the brightness of the object which is obtained from the output of the first sensor 1a is represented by an exposure value $E_{vA}$, the correcting value C based on the magnification $M_v$ in the third information determining means 4c is preferably given by the following equation.

$$M_v = D_v/2 - f_v + 10$$

$$C = \omega \cdot (M_v - 8)(E_{vA} - 8)/32$$

wherein
$\omega$ = constant,
$D_v = 2\log_2 D$
$f_v = \log_2 f$ wherein f is a focal length (mm) and D is an object distance (m).

Preferably, an additional correcting means for correcting the brightness of the object which is obtained from the output of the first sensor 1a in accordance with the kind of the photographing lens to be used is provided.

Figure 1B:
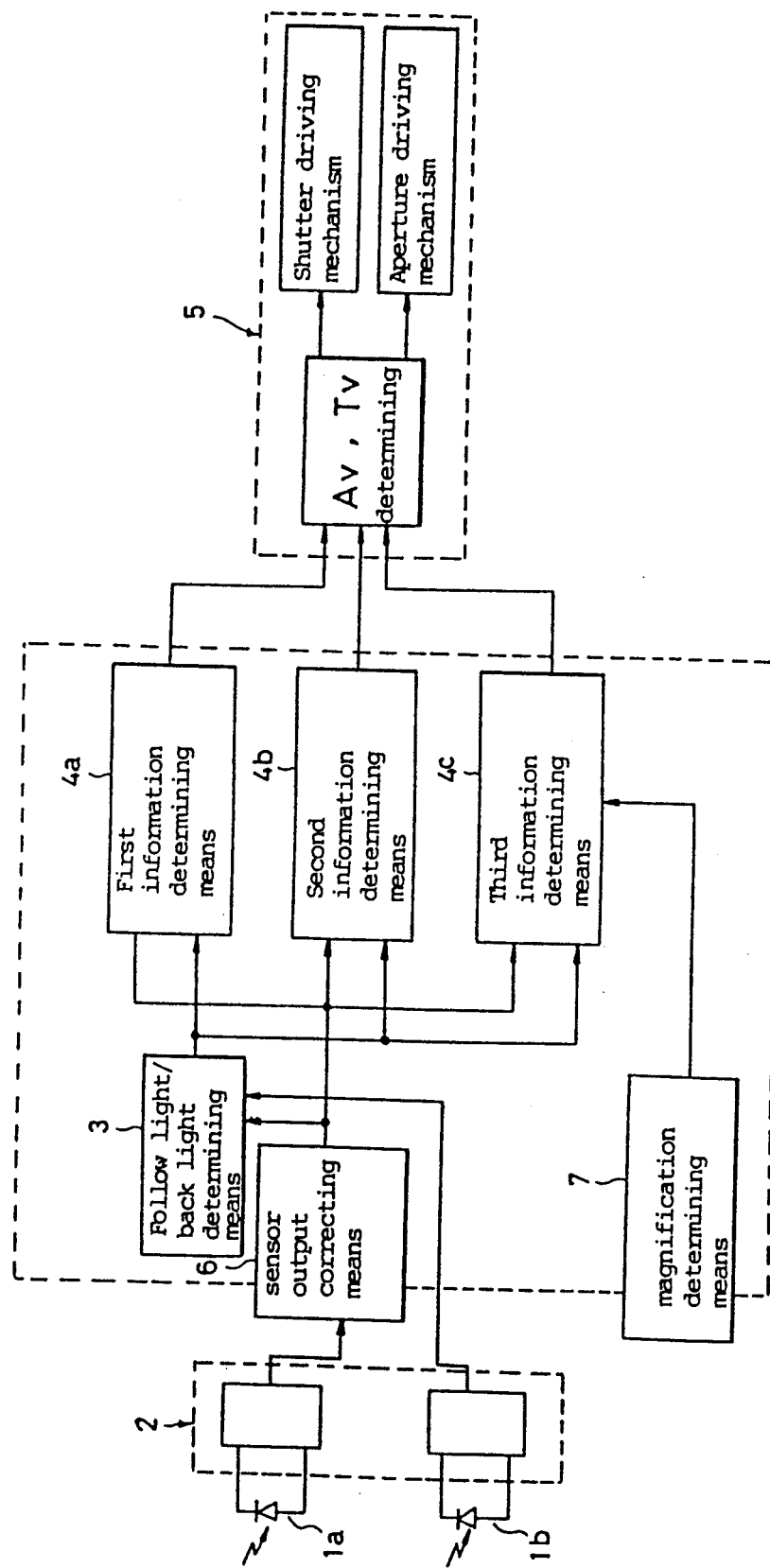
FIG. 1B is a block diagram showing an embodiment of a multi-area brightness measuring apparatus according to the present invention.

FIG. 1B shows an arrangement of the above-mentioned components 1, 2, 4a~4c, a magnification determining means 7 for determining the magnification $M_v$, and a correcting means 6 for correcting the brightness value which is obtained from the output of the first sensor.

The brightness information detected by the multi-area brightness measuring apparatus according to the present invention determines an aperture $A_v$ and a shutter speed $T_v$ to actuate shutter and aperture driving mechanisms as generally shown at 5 in FIGS. 1A and 1B.

The multi-area brightness measuring apparatus according to the present invention operates as follows.

It is supposed that when the value is obtained by subtracting the brightness value obtained from the output of the second sensor 1b from the brightness value obtained from the output of the first sensor 1a is above a predetermined positive value, the apparatus is in the follow light state, and when the subtraction value is below a predetermined negative value, the apparatus is in the back light state.

In case of follow light state in which the center area of the brightness measuring area is light, the first brightness information determining means 4a operates to generate a subtraction value which is obtained by subtracting the corresponding correcting value from the brightness value of the first sensor as a brightness information for controlling the exposure. As a result, the exposure is moved to the brightness of the center area (lighter side) to prevent the under-exposure.

In case of back light state in which the center area of the measuring area is dark, when the brightness obtained from the output of the first sensor is below a first predetermined brightness (which is represented by $\delta$ in the embodiment), the second brightness information determining means 4b operates to generate the brightness information which is obtained by adding the corresponding correcting value to the brightness value of the first sensor in order to control the exposure. Consequently, the exposure is moved to the brightness of the center area (lighter side) to prevent the over-exposure.

In case of back light state, when the brightness value obtained from the output of the first sensor is above a second predetermined brightness which is represented by $\theta(\theta > \delta)$ in the embodiment and when the magnification is within a certain range, namely, briefly speaking, when the surface area of the main object (e.g., a face of a figure) is within a certain range with respect to the surface area of the center area, the third brightness information determining means 4c operates, so that the brightness information which is obtained by subtracting the correcting value corresponding to the magnification $M_v$ from the brightness of the first sensor is issued to control the exposure. Accordingly, the increase of brightness of the center area which is caused by the brightness of the background in spite of the low brightness of the main object can be compensated to prevent the under-exposure of the main object.

When a difference in brightness between the first sensor and the second sensor is very small, or if the magnification is not within the predetermined range, namely when the surface area of the main object is almost the same as or less than the surface area of the center area, the brightness of the center area can be measured by the output of the first sensor.

The sensor outputs can be adjusted in accordance with the kind of the photographing lenses, as mentioned above, and accordingly, even when different kinds of photographing lenses are used, a precise brightness information can be obtained.

The following discussion will be directed to a camera having an exchangeable lens and an automatic focusing (AF) function, to which a multi-area brightness measuring apparatus according to the present invention is applied.

Note that the drawings briefly show the construction or the arrangement of a multi-area brightness measuring apparatus according to the present invention and accordingly the present invention is not limited to those of the illustrated embodiments.

An exchangeable lens type of camera, shown in FIG. 2, has a camera body 31 to which a photographing lens (taking lens) 11 is attached. In the illustrated embodiment, the photographing lens is a single focus photographing lens. Different kinds of photographing lenses can be selectively attached to the camera body, as will be described hereinafter.

The photographing lens 11 includes a lens system 15 having a focusing lens 13 movable in the optical axis directions and a drive transmission mechanism 17 which transmits the drive force from a drive source on the camera body side to the movable lens 13. In addition, the photographing lens 11 has a lens ROM (Read Only Memory) 19 which stores information on an aperture, a focal length and an object distance depending on the position of the movable lens 13 etc. and a group of electrical contacts 21 which electrically connect the ROM 19 to a CPU 77 incorporated in the camera body 31, and a distance detecting portion 23 which detects the position of the movable lens 13.

The camera body 31 has an optical system including a main mirror 33, an auxiliary mirror 35, a focusing plate 37 and a pentagonal prism 39 etc., a photographing portion 41 which contributes to an automatic focusing, a drive mechanism 43 which moves the movable lens 13 of the photographing lens 11, light receiving elements 45 and 47 for an automatic exposure control (AE) and for TTL control when a strobe device is used, a center indicating portion 49 which indicates the state of camera, an indicator 51 within a finder for indicating the state of AF and AE, an incorporated strobe 53, a sequential motor 55 for winding and rewinding a film, a group of electrical contacts 57 on the body side, corresponding to the contact group 21 on the lens side, a shutter button 59, a synchronizing contact, such as an X-contact 61, and a memory lock button 63 which is turned ON to lock the outstanding exposure value. In the illustrated embodiment, the shutter button 59 has two first and second switch portions 59a and 59b which are turned ON when the shutter 59 is pressed down by a half step and when the shutter button is fully pressed down, respectively. The automatic focusing operation can be effected when the shutter button 59 is pressed down by a half step. The release operation can be effected when the shutter button 59 is completely pressed down.

The camera body 31 has therein an IPU (Indication Processing Unit: micro computer) which controls the center indicating portion 49, a PCU (Power Control Unit) 73 which controls an interface of the photographing portion 41, the sequential motor 55, the AF motor 43, the aperture and a shutter releasing magnet (not shown) and which has an E² PROM 73, a DPU (Data Processing Unit: micro computer) 75 which controls the indicator 51 within the finder, and a CPU (Central Processing Unit: micro computer) 77. The CPU 77 controls the IPU 71, the PCU 73, the DPU 75 and the lens ROM 19 within the photographing lens 11.

A multi-area brightness measuring apparatus incorporated in a camera shown in FIG. 2 is described below.

(1) Sensors for Measuring Brightness

Figure 3A:
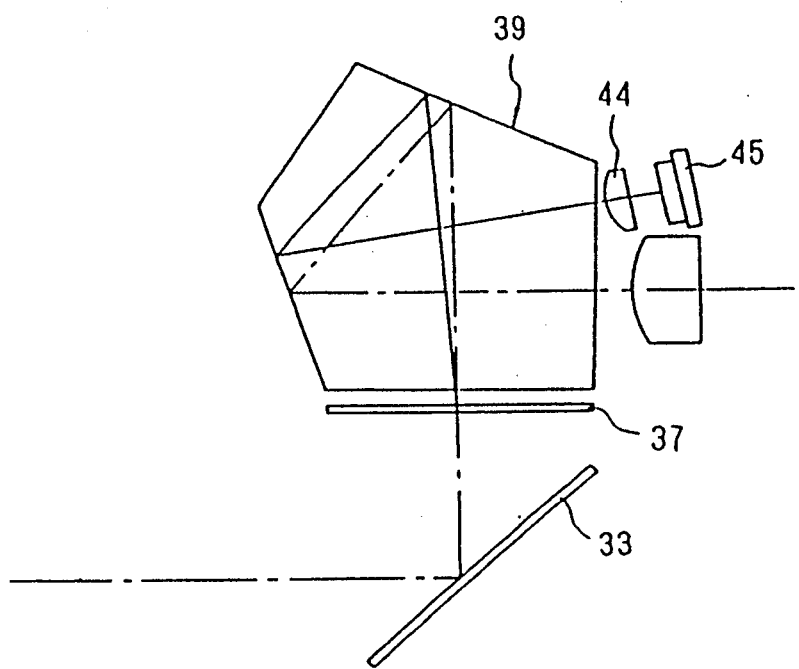
FIGS. 3A, 3B and 3C are explanatory views of a light receiving element used in the multi-area brightness measuring apparatus according to the present invention.
Figure 3B:
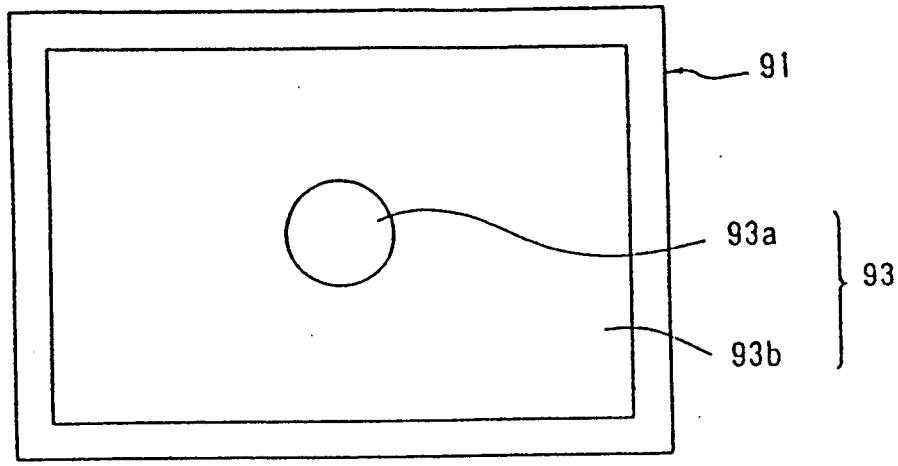
Figure 3C:
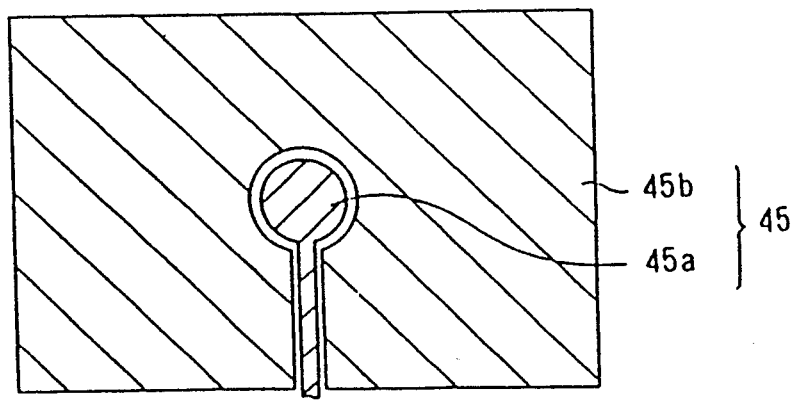

A first sensor 45a for measuring the brightness of the center area of the measuring area and a second sensor 45b for measuring the brightness of the adjacent area located on the circumference of the center area constitute a light receiving element 45 shown in FIG. 2. FIG. 3A schematically shows a pentagonal prism 39 and the light receiving element 45 and the surroundings thereof. FIG. 3B is a plan view of a photographing area and a measuring area. FIG. 3C is a plan view showing a construction of the light receiving element 45. As shown in FIG. 3A, a part of light of the object which is transmitted through the focusing plate 37 is converged onto the light receiving area of the light receiving element 45 through the imaging lens 44. The measuring area 93 is slightly smaller than the photographing area 91, as shown in FIG. 3C. The measuring area 93 is divided into the center area 93a which includes the center of the photographing area 91, and a circumferential area (adjacent area) 93b which surrounds the center area 93a and which is independent from the center area. The current signals which are produced as a result of a photoelectric conversion by the first and second sensors 45a and 45b are input into a processing circuit which will be discussed hereinafter.

(2) Processing Circuit of Brightness Measuring Sensors

FIG. 3D shows an example of the processing circuit in which the current signals of the first and second sensors 45a and 45b are processed. In the illustrated embodiment, each of the first and second sensors 45a and 45b has a logarithmic compression circuit 75a, an amplifier 75b and an A/D converter 75c. In the illustrated embodiment, the processing circuit is arranged in the DPU 75, so that the digital data issued from the processing circuit are supplied to the CPU 77 as a brightness information determining means.

(3) Explanation of the Various Means

The following description will be directed to the follow light and back light detecting means 3 for detecting whether the object in the center area is in the follow light state or the back light state; the first, second and third brightness information determining means 4a, 4a and 4c; the sensor output correcting means 6 for correcting the brightness of the object obtained by the first sensor 45a in accordance with the kind of the photographing lens; and the magnification determining means 7 for determining the magnification $M_y$ based on the focal length and the object distance. These means are mainly composed of the CPU 77 (FIG. 2). The CPU 77 is connected to the lens ROM 19, the PCU 73, the DPU 75, switchers (not shown) of the shutter button etc., through the input and output ports of the CPU.

Figure 4:
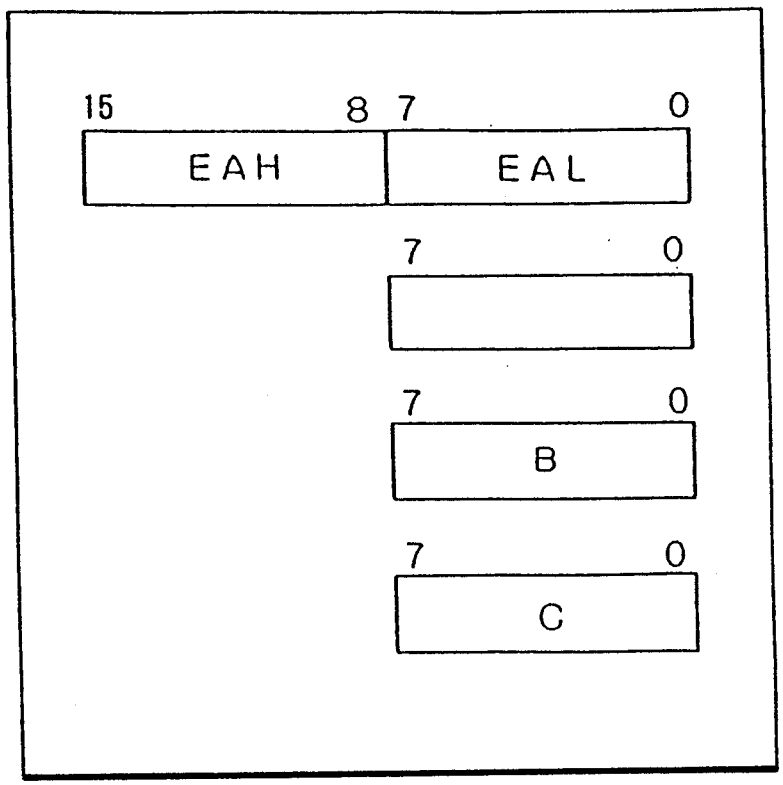
FIG. 4 is a block diagram of RAM used in the present invention.
Figure 5A:
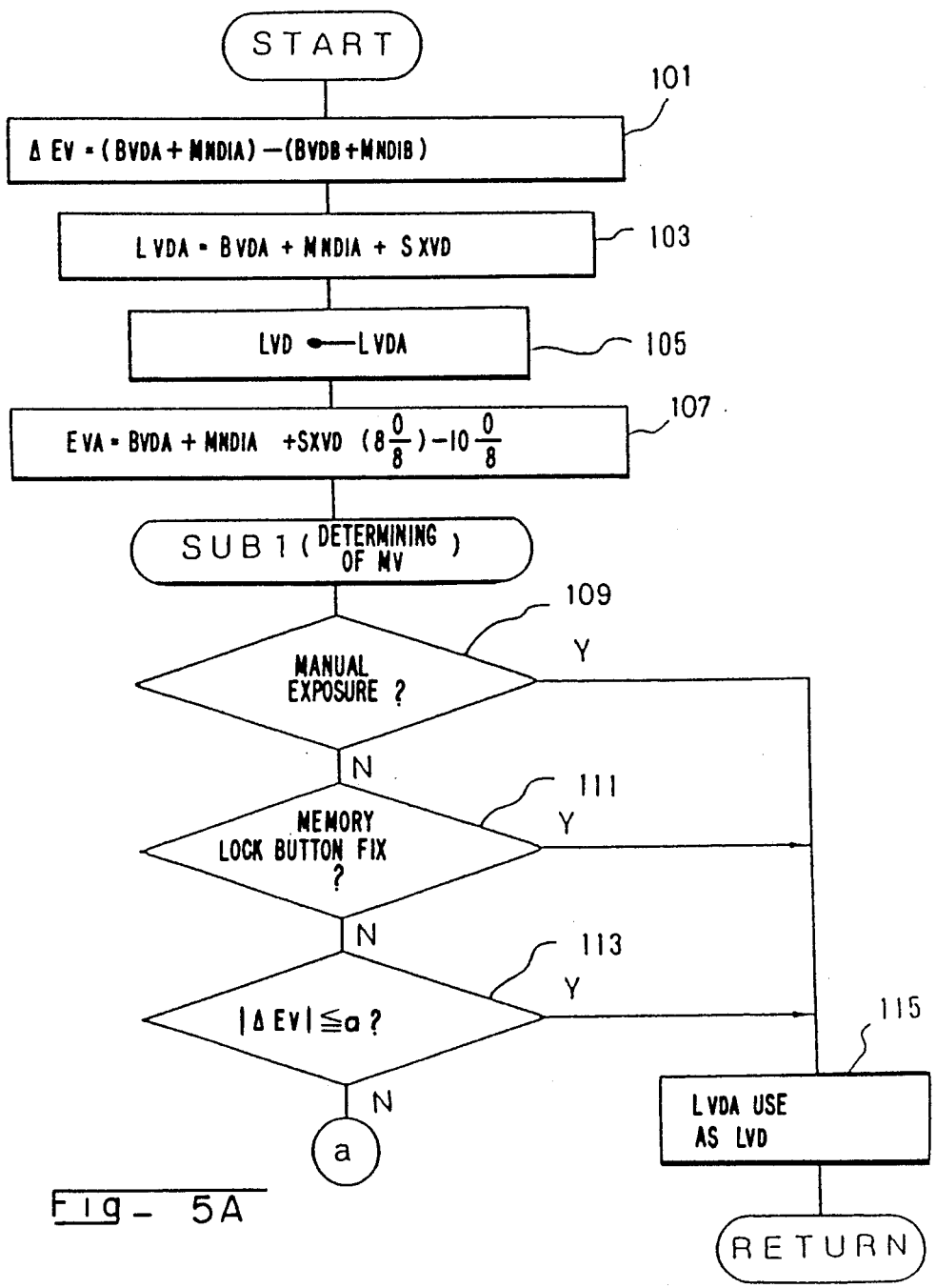
FIGS. 5A, 5B and 5C are flow charts of a CPU for driving a means for detecting follow light and back light state, and first, second and third brightness information determining means in the present invention.
Figure 5B:
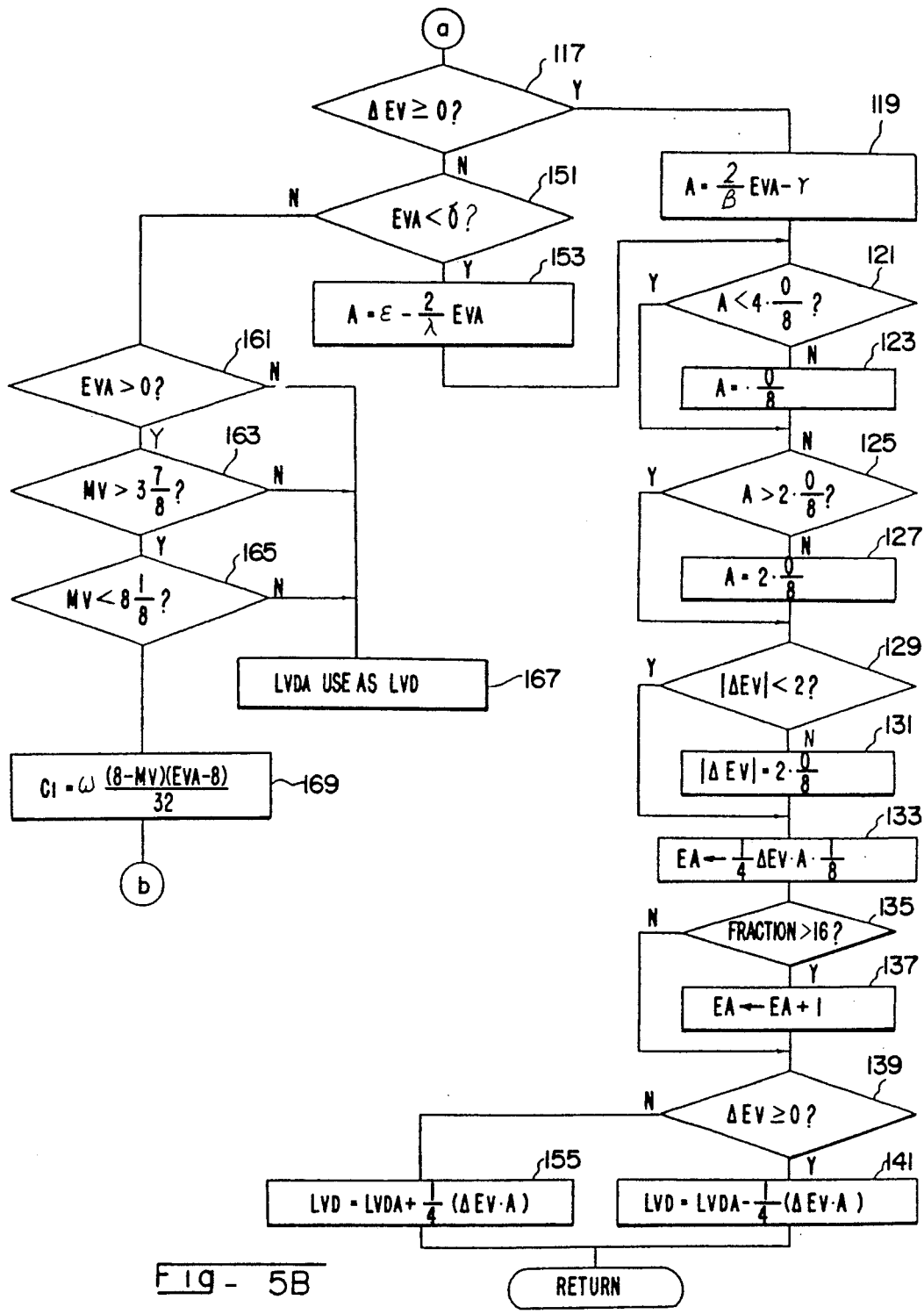
Figure 5C:
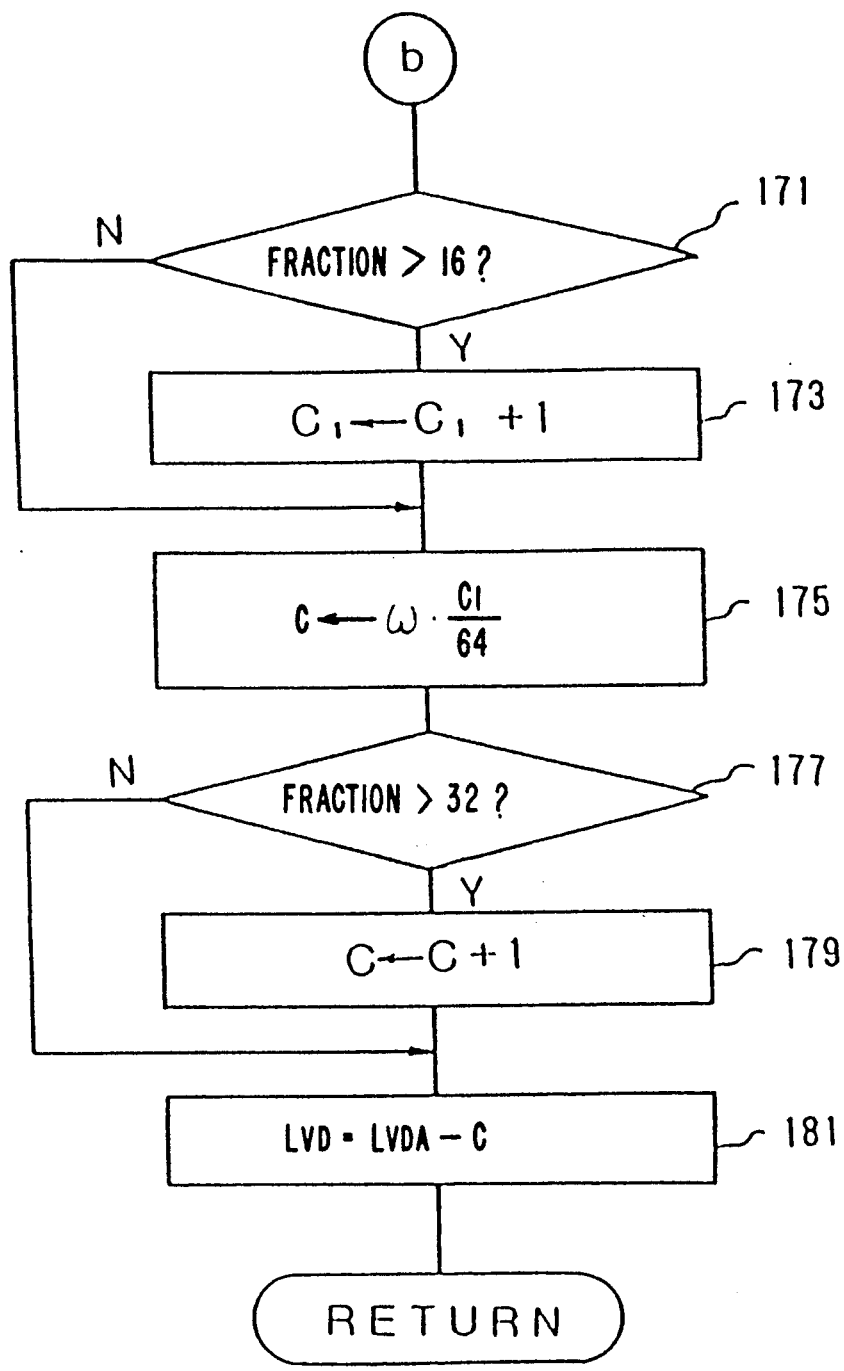

The CPU 77 also has a ROM (Read Only Memory) which stores a program for driving the above-mentioned means 3~7, and a RAM (Random Access Memory) which stores data at the operation of these means. In the illustrated embodiment, the RAM has an EA register which serves as a 16-bit register, B and C registers (both being 8-bit registors), and an accumulator $A_{cc}$, as shown in FIG. 4. The register has an EAH register for higher 8-bits and an EAL register for lower 8-bits. FIGS. 5A~5C are views showing a flow chart of the CPU for driving the above-mentioned means, namely the divided brightness measuring apparatus according to the present invention.

① Commencement of Measurement

When the shutter button 59 is pushed down by a half step, the automatic focusing operation begins for the object located in the center portion of the photographing area. Since the subject of the present invention is not directly addressed to the automatic focusing operation, a detailed description thereof is omitted. When the movable lens 13 comes to the focused position, the measurement of the brightness for the automatic exposure control commences. As mentioned before with reference to FIG. 3C, the center area 93a of the measuring area 93 is detected by the first sensor 45a, and the circumferential area (adjacent area) 93b is detected by the second sensor 45b. The outputs of the sensors 45a and 45 b are processed by the DPU 75. In the illustrated embodiment, the brightness of the center area 93a and the adjacent area 93b of the photographing area 93 are stored as brightness values $B_{VDA}$ and $B_{VDB}$ at predetermined addresses of the RAM in the CPU 77, respectively. In the illustrated embodiment, the brightness information which is finally used to control the exposure is represented by $L_{vd}$.

From the brightness values $B_{vdb}$ and $B_{vdb}$ and the aperture correcting values $M_{INDIA}$ and $M_{INDIB}$ which are determined in accordance with the open aperture of the photographing lens used, the following calculation is performed to obtain a difference $\Delta E_v$ of the brightness value between the first sensor 45a and the second sensor 45b, so that the result is stored at a predetermined address of the RAM 77d, at step 101

$$\Delta E_v = (B_{VDA} + M_{NDIA}) - (B_{VDB} + M_{NDIB})$$

The brightness information $L_{VDA}$ of the center area obtained by the first sensor 45a is given by the following equation which is performed at step 103.

$$L_{VDA} = B_{VDA} + M_{NDIA} + S_{XVD}$$

wherein $S_{XVD}$ is a photosensitivity of a film.

The value $L_{VDA}$ thus obtained is stored in the RAM as a final brightness information (step 105). Note that the aperture correcting values $M_{NDIA}$ and $M_{NDIB}$ which are stored in the RAM are calculated from and inherent lens information which is stored in advance in the lens ROM 19 and a brightness correcting coefficient which is prestored in the E²PROM 73a of the PCU 73 in the camera body 31. After that, the exposure value $E_{VA}$ corresponding to 100 of the film sensitivity (ISO) is obtained at step 107.

After that, the process for obtaining the magnification $M_y$ is performed, which will be described in detail hereinafter with reference to "Determining Means of Magnification $M_y$".

② Follow light and Back-Light Detecting Means

Before whether the object is in the follow light state or in the back light state is judged, whether or not a photographer wishes a manual exposure control is judged at step 109. The judgement is effected by a change of voltage of a predetermined contact of the contact group 57 which change takes place when the aperture ring of the photographing lens is moved to a manual position. In case of a manual exposure control, the control proceeds to step 115 at which the brightness value $L_{VDA}$ detected by the first sensor is used as the brightness information $L_{VD}$. When a photographer wishes an automatic exposure control, the control proceeds to step 111 at which position whether or not the memory lock button 63 which fixes the exposure condition is pushed down is checked. When the memory block button 63 is pushed down, the control proceeds to step 115 at which the brightness value $L_{VDA}$ is detected by the first sensor is used as the brightness information $L_{VD}$. If the memory lock button 63 is not pressed down, the control proceeds to step 113 at which position whether or not there is substantially no difference in output between the first sensor and the second sensor, namely whether or not $\Delta E_V$ (absolute value) is within a predetermined reference value $\alpha$ is checked. The reference value $\alpha$ is prestored in the E²PROM 73a of the PCU 73 and which can be optionally selected. The attached Table 1 shows the references values $\alpha$, the first predetermined brightness value $\delta$, and the second predetermined brightness value $\theta$. In the E²PROM 73a of the PCU 73 are stored 7-bit data (59H) of $\theta_3 \theta_2 \theta_1 \delta_2 \delta_1 \alpha_2 \alpha_1$ which determine $\alpha$, $\delta$, and $\theta$. The CPU 77 determines $\delta$ represented by a combination of $\alpha_2$ and $\alpha_1$, $\delta$ represented by a combination of $\delta_2$ and $\delta_1$, and $\theta$ represented by a combination of $\theta_3$, $\theta_2$ and $\theta_1$, respectively. For the present data 59H, $\alpha = 2/8$, $\delta = 6$, and $\theta = 13$.

If there is substantially no difference in brightness between the first sensor 45a and the second sensor 45b at step 111, the control proceeds to step 115.

If the absolute value of the difference in brightness between the first sensor 45a and the second sensor 45b is within $\alpha$ ($|\Delta E_V| \leq \alpha$), when $\Delta E_V \geq 0$, the object is judged to be in the follow light state, and when $\Delta E_V < 0$, the object is judged to be in the back light state (step 117).

③ First Brightness Information Determining Means

In the multi-area brightness information determining means according to the present invention, the first brightness information determining means 45a which generates an output value which is obtained by subtracting the corresponding follow light correcting value from the brightness obtained from the first sensor 45a as the brightness information $L_{VD}$ operates in the follow light state. The follow light correcting value which can be optionally selected is equal to a half of the difference $\Delta E_V$ of the outputs of the first and second sensors 45a and 45b at a low brightness, and increases at a constant pitch as the brightness becomes high.

To obtain the correcting value, the first brightness information determining means operates as follows.

The exposure value $E_{VA}$ which corresponds to the brightness represented by the ISO 100 is inserted in the following equation to obtain a coefficient A (step 119).

$$A = 2E_{VA}/\beta - \gamma$$

wherein $\beta$ and $\gamma$ are predetermined constants which are stored in the E²PROM 73a of the PCU 73 and which are optionally selected.

The attached Table 2 shows $\beta$ and $\gamma$ stored in the E²PROM 73a of the PCU 73. 7-bit data (4BH) of $\gamma_4 \gamma_3 \gamma_2 \gamma_1 \beta_3 \beta_2 \beta_1$ which determine $\beta$ and $\gamma$ are stored in the E₂PROM 73a of the PCU 73 at predetermined addresses. In the CPU 77, $\beta$ is represented by a combination of $\beta_3$, $\beta_2$ and $\beta_1$. On the other hand, $\gamma$ is given by the following equation.

$$\gamma = 2^2 \gamma_4 + 2^1 \gamma_3 + 2^0 \gamma_2 + 2^{-1} \gamma_1$$

For the present data 4BH, $\beta = 3$, $\gamma = 4.5$.

It can be found that the coefficient A which is obtained by the equation $A = 2E_{VA}/\beta - \gamma$, increases as the brightness of the first sensor 45a becomes high. In the illustrated embodiment, threshold values of the coefficient A are 4 and 2, so that when the coefficient A is larger than 4, it is fixed to be 4 (A = 4) and when the coefficient A is smaller than 2, it is fixed to be 2 (A = 2). When 2 < A < 4, the coefficient A obtained above is used as it is (steps 121 ~ 127). As a result, the coefficient A is a value corresponding to the brightness of the first sensor within a range of $2 \leq A \leq 4$. When the difference $\Delta E_V$ of the brightness of the first sensor 45a and the brightness of the second sensor 45b is extremely large, whether or not the absolute value of $\Delta E_V$ is larger than 2 is checked at step 129. If $\Delta E_V \geq 2$, $\Delta E_V$ is fixed to be 2 ($\Delta E_V = 2$), and if $\Delta E_V < 2$, the value of $\Delta E_V$ is used as it is (step 131).

After that, since the multiplication of $\Delta E_V$ and the coefficient A corresponds to the multiplication of $\frac{1}{8}$ step and $\frac{1}{8}$ step, $\frac{1}{4} \cdot \Delta E_V \cdot A$ is divided by 8, so that the fraction of the division is rounded to increase the precision of the measurement (steps 133 ~ 137).

Consequently, whether $\Delta E_V$ is positive or negative is checked at step 139. This is because that steps 121 ~ 137 are common to the follow light state and the back light state, but the subsequent steps depend on the follow light state or the back light state. If the object is in the follow light state ($\Delta E_V \geq 0$), the control proceeds to step 141 at which the brightness information $L_{VD}$ which is obtained by subtracting the corresponding follow light correcting value $\Delta E_V \cdot A/4$ from the brightness $L_{VDA}$ obtained from the first sensor 45a is issued, as can be seen in the following equation.

$$L_{VD} = L_{VDA} - \Delta E_V \cdot A/4$$

6
With the process at step 141, if the coefficient A is smaller than 2 (A < 2) because of the low brightness, A is treated to be 2 (A = 2), and accordingly the brightness information $L_{VD}$ which is obtained by subtracting $\Delta E_V/2$ from the brightness $L_{VDA}$ obtained by the first sensor 45a is issued to control the exposure. When the coefficient A is larger than 2, the value $L_{VD}$ which is obtained by subtracting the follow light correcting valve $\Delta E_V \cdot A/4$ corresponding to the coefficient A from the brightness information $L_{VDA}$. Namely, the brightness information for controlling the exposure $L_{VD}$ in the follow light state is gradually shifting from a mean value of the outputs of the first and second sensors 45a and 45b to a brightness information $L_{VDA}$ which is obtained from the output of the second sensor 45b in accordance with the exposure valve $E_{VA}$ obtained from the output of the first sensor 45a and finally becomes $L_{VDA}$ (A = 4). Note that when $\Delta E_V$ is larger than 2, $\Delta E_V$ is fixed to be 2 ($\Delta E_V = 2$), as mentioned before.

FIG. 6A is a diagram in which an abscissa represents the exposure value $E_{VA}$ corresponding to the brightness value obtained by the first sensor 45a and an ordinate represents the follow light correcting value for realizing an over-exposure.

If the object is judged to be in the back light state at step 117, the exposure value $E_{VA}$ corresponding to the brightness value obtained by the first sensor 45a is compared with the first predetermined reference value $\delta$ (step 151). The first reference brightness value $\delta$ is stored in the E²PROM 73a of the PCU 73, as mentioned before. In the illustrated embodiment, $\delta = 6$.

The control proceeds to different steps in accordance with the result of the comparison at step 151.

④ Second Brightness Information Determining Means

When the exposure value $E_{VA}$ corresponding to the brightness obtained from the first sensor 45a at the back light state is smaller than the first predetermined reference brightness $\delta$, the second brightness information determining means operates to issue the output which is obtained by adding the corresponding back light correcting value to the brightness obtained from the first sensor 45a.

First, from the following equation which is substituted by the exposure value $E_{VA}$ corresponding to the brightness obtained from the first sensor 45a, we have the value of the coefficient A.

$$A = \epsilon - 2E_{VA}/\lambda$$

wherein $\epsilon$ and $\lambda$ are predetermined constants which can be optionally selected and which are stored in the E²PROM 73a of the PCU 73. Table 3 shows the constants $\epsilon$ and $\lambda$. 7-bits data (63H) of $\epsilon_4 \epsilon_3 \epsilon_2 \epsilon_1 \lambda_3 \lambda_2 \lambda_1$ which determine $\epsilon$ and $\lambda$. The CPU 77 determines $\lambda$ based on a combination of $\lambda_3$, $\lambda_2$ and $\lambda_1$, and $\epsilon$ based on the following equation.

$$\epsilon = 2^2\epsilon_4 + 2^1\epsilon_3 + 2^0\epsilon_2 + 2^{-1}\epsilon_1$$

For the present data 63H, $\epsilon = 6$, $\lambda = 8$.

It can be found that the coefficient A which is obtained from the equation ($A = \epsilon - 2E_{VA}/\lambda$) becomes small as the exposure value $E_{VA}$ corresponding to the brightness obtained from the first sensor 45a. The threshold values of the coefficient A are 4 and 2. When A is larger than 4 and smaller than 2, the coefficient A is fixed to be 4 ($A = 4$) and 2 ($A = 2$) respectively. When $2 < A < 4$, the coefficient obtained by the calculation is used as it is (steps 121~127). Consequently, the coefficient A is a value corresponding to the brightness of the first sensor 45a between $2 \leq A \leq 4$.

After that, whether or not the absolute value of the difference $\Delta E_V$ in brightness between the first sensor 45a and the second sensor 45b is larger than 2 at step 129. If $\Delta E_V > 2$, $\Delta E_V$ is supposed and fixed to be 2 ($\Delta E_V = 2$) and if $\Delta E_V < 2$, $\Delta E_V$ is used as it is (steps 129 and 131). After that, since the multiplication of $\Delta E_V$ and the coefficient A corresponds to the multiplication of ⅛ step and ¼ step, ¼·$\Delta E_V$·A is divided by 8, so that the fraction of the division is rounded to increase the precision of the measurement (steps 133~137).

After that, since the object is in the back light state, the control proceeds to step 155 at which the brightness information $L_{VD}$ which is obtained by adding the corresponding back light correcting value to the brightness $L_{VDA}$ obtained from the first sensor 45a is issued, as can be seen in the following equation.

$$L_{VD} = L_{VDA} + \Delta E_V \cdot A/4$$

With the process at step 141, if the coefficient A is larger than 4 ($A > 4$) because of the low brightness, A is treated to supposed to be 4 ($A = 4$), and accordingly the brightness information which is obtained by adding the difference $\Delta E_V$ (if $\Delta E_V > 2$, $\Delta E_V$ is supposed to be 2) to the brightness $L_{VDA}$ obtained by the first sensor 45a is issued to control the exposure. Namely, the final brightness information $L_{VD}$ is a value which is equal to the brightness obtained by the second sensor 45b or to the brightness plus 2·$E_V$.

In case of $4 > A > 2$, the brightness information $L_{VD}$ for controlling the exposure is obtained by adding the corresponding back light correcting value $\Delta E_V \cdot A/4$ to $L_{VDA}$ when the brightness of the first sensor 45a is smaller than 6 (since it is supposed that $\delta = 6$).

FIG. 6B is a diagram in which an abscissa represents the exposure value $E_{VA}$ ($< \delta$) corresponding to the brightness value obtained by the first sensor 45a and an ordinate represents the back light correcting value for realizing an under-exposure.

If $E_{VA} \geq \delta$ at step 151, the exposure value $E_{VA}$ corresponding to the brightness obtained from the first sensor 45a is compared with the second predetermined reference value $\theta$ at step 161. The second predetermined reference value $\theta$ is stored in the E²PROM of the CPU 73, as mentioned before with reference to Table 1. In the illustrated embodiment, $\theta = 13$. At steps 151 and 161, if $\delta \leq E_{VA} \leq \theta$, the brightness information $L_{VDA}$ which is obtained by the first sensor 45a is output as the brightness information $L_{VD}$ to control the exposure as it is, At step 161, $E_{VA} > \theta$, basically, the brightness information $L_{VDA}$ which is obtained by the first sensor 45a is output as the brightness information $L_{VD}$ to control the exposure as it is. Note that if the magnification $M_V$ which is determined by the focal length of the photographing lens and the object distance is within the predetermined range, the third brightness information determining means operates, so that the value which is obtained by subtracting the corresponding correcting value from the brightness obtained by the first sensor is output as the brightness information to control the exposure value.

Before the discussion is directed to the third brightness information determining means, the reason that the magnification is taken into consideration and means for determining the magnification will be described below.

⑤ Magnification Determining Means

Figure 7A:
FIGS. 7A, 7B and 7C are schematic views showing a reason of introduction of the magnification $M_v$.
Figure 7B:
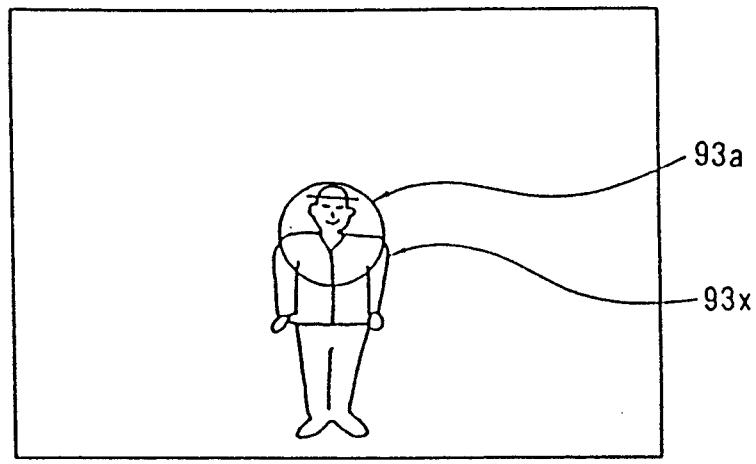
Figure 7C:
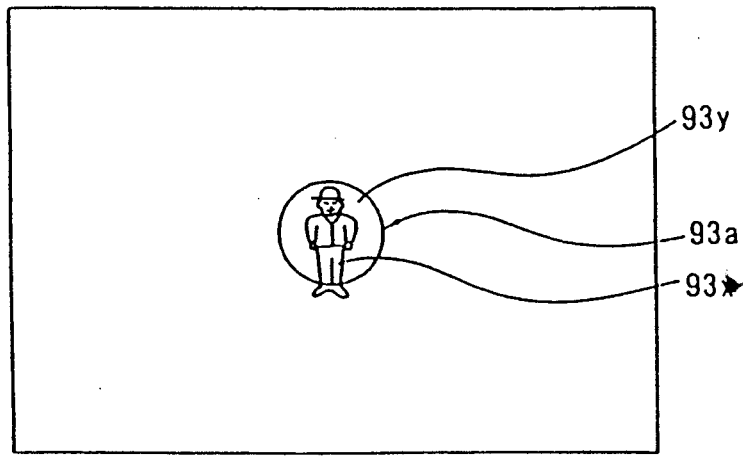

As can be seen in FIGS. 7A to 7C, the brightness obtained by the brightness measuring area 93a of the first sensor 45a is largely influenced by the surface area ratio between the main object and the background, at the back light state. Namely, as shown in FIG. 7A, supposing that the main subject is the human figure 93X, when the surface area of the human figure 93x is substantially equal to or larger than that of the measuring area 93a, the brightness information obtained by the first sensor can be considered substantially equal to the brightness of the human figure 93x (main object). On the contrary, in case of FIG. 7C, the brightness obtained can be considered substantially equal to the brightness of the background 93y.

In case of FIG. 7B in which the surface area of the background 93y occupies a substantial part of the measuring area 93a, supposing that the size of the measuring area on the image plane is x (mm), if the magnification is $x/2^9$, the brightness of the main object 93x measured by the first sensor 45a will be higher than a real brightness, since the main object is largely influenced by the brighter background. This results in an under-exposure. To prevent such an under exposure, the concept of the magnification $M_V$ is introduced. The magnification $M_V$ is determined as follows.

⑤-(A) Obtaining of Focal Length Information and Object Distance Information

Means for obtaining the focal length of the photographing lens and the object distance will be first explained below.

Figure 8A:
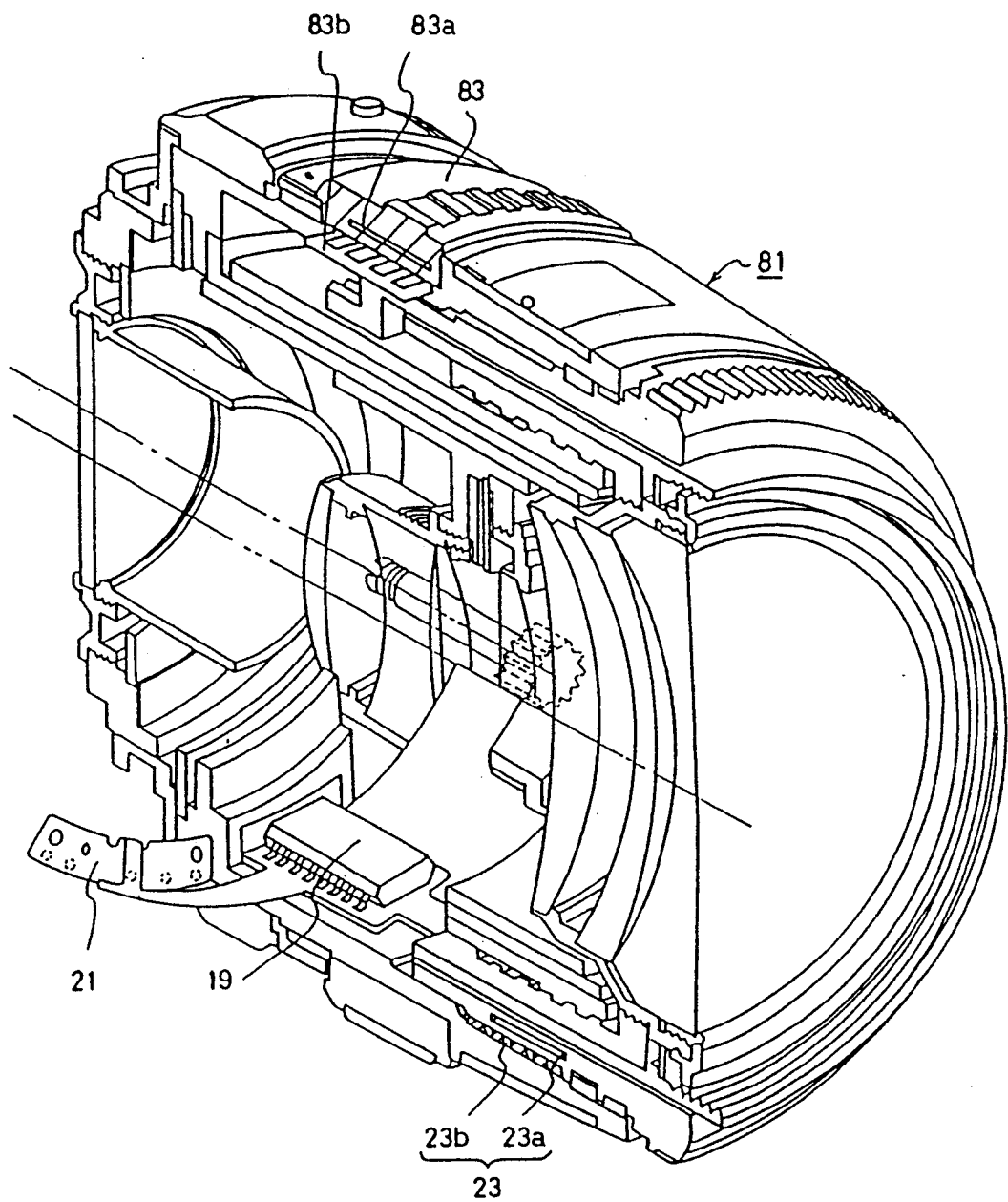

FIG. 8A is a partially broken perspective view of a zoom lens 81 which can be attached to a camera body 31, taken along a optical axis.

In FIG. 8A, a distance detecting portion 23 which detects the object distance has a brush 23a which moves together with the movable lens and a distance code plate 23b with which the brush 23a comes into contact. The brush 23a and the distance code plate 23b are also provided on the single focus photographing lens 11 shown in FIG. 2. The zoom lens 81 has, in addition to the components provided on the photographing lens 11, a rotatable zoom ring 83, a brush 83a which is secured to the zoom ring 83 to move in accordance with the rotation of the zoom ring 83, and a zoom code plate 83b with which the brush 83a comes into sliding contact.

FIG. 8B shows electrical components within the lens, including the zoom code plate 83b, the lens ROM 19, the electrical contact group 21 on the lens side, and the distance code plate 23b. In an actual arrangement, the code plates 23b and 83b are bent along the inner periphery of the zoom lens barrel.

FIG. 8C is an enlarged perspective view of a zoom encoder having the zoom ring 83, the brush 83a, and the zoom code plate 83b.

When the zoom ring 83 is rotated by a photographer to change the focal length of the photographing lens 81, the brush 83a comes into slide contact with the zoom code plate 83b in the direction of the length of the zoom code plate 83b, so that when the rotating of zoom ring 83 is stopped, the brush 83a is also stopped. On the surface of the zoom code plate 83b, that is brought into contact with the brush 83a, are provided a predetermined pattern of four conductors $a_1$, $a_2$, $a_3$ and $a_4$ which extend from the input port of the lens ROM 19. The number of the conductors $a_1$, $a_2$, $a_3$ and $a_4$ is not limited to four, and can be properly designed depending on the resolving power representing the focal length varying the zooming operation. One of the four conductors $a_1$, $a_2$, $a_3$ and $a_4$, for example, the conductor $a_4$ is grounded. The widths of the remaining conductors $a_2 \sim a_3$ vary along the length thereof. On the other hand, the brush 83a has four contacts $b_1 \sim b_4$ which are connected to each other and which correspond to the conductor patterns. In the illustrated embodiment, each contacts has two bifurcated contact arms to increase the reliability of connection of the contacts to the corresponding conductors, though the shape of the contacts is not limited to the illustrated one. The contacts $b_1 \sim b_3$ are brought into contact with the portions of increased widths of the corresponding conductor patterns $a_1 \sim a_3$. The contact $b_4$ is always brought into contact with the corresponding conductor (ground) $a_4$.

At the position $z_1$ (FIG. 8B) of the zoom code plate 83b, the contacts $b_1$ and $b_2$ are in contact with the corresponding conductors $a_1$ and $a_2$, and the contact $b_3$ is not in contact with the corresponding conductor $a_3$. Since the conductors $a_1 \sim a_3$ are pulled-up in the lens ROM 19 and since the contacts $b_1 \sim b_4$ of the brush 83a are grounded through the conductor pattern $a_4$, the voltage level of the conductor patterns $a_1$, $a_2$ and $a_3$ at the position $z_1$ is represented by (0, 0, 1), wherein "0" is low level and "1" is high level. Similarly, the voltage levels at the positions $z_2$, $z_3$ and $z_4$ are (0, 1, 0) (1, 0, 0) and (0, 0, 0), respectively. The electrical signals obtained by the voltage levels are directly used as address signals of the lens ROM 19 in which focal length data corresponding to the addresses are stored in advance. Consequently, the focal length data corresponding to the addresses can be read out. The focal length data thus read are sent to the CPU 77 through the electrical contact groups 21 and 57.

The construction of the focal length detecting portion 23 is similar in principle to the zoom encoder portion shown in FIG. 8C. Accordingly, when the movable lens is stopped, electrical signals corresponding to the positions of the brush 23a on the distance code plate 23b are produced in accordance with the stop position of the movable lens, so that the electrical signals can be used as address data for the lens ROM 19. As a result, information representing the object distance corresponding to the addresses can be read from the lens ROM 19. The information are transmitted to the CPU 77 through the electrical contact groups 21 and 57.

⑤0(B) Calculation of Magnification $M_V$

The magnification M can be obtained from the focal length data of the photographing lens fed into the CPU 77 and the object distance. The magnification M is given by $(D \times 10^3/f)$, wherein f is focal length (mm) of the photographing lens and D is object distance (m). However, the calculation is rather complicated, and accordingly, the magnification is replaced with a logarithmic value $M_V$ for simplification, which is defined by the following equations:

$M = D(mm)/f(mm)$ $f_V = \log_2 f$ $D_V = 2 \log_2 D$ $\therefore M_V = \log_2 M = \log_2(D \times 10^3/f) = \log_2 D - \log_2 D + \log_2 10^3$ $\therefore M_V \approx D_V/2 - f_V + 10$ The relationships between f(mm) and $f_V$, D(m) and $D_V$, and M and $M_V$ are shown in the following table.

| f (mm) | $f_v$ | D (m) | $D_v$ | M | $M_V$ |
|---|---|---|---|---|---|
| 1 | 0 | 1 | 0 | 1 | 0 |
| 2 | 1 | 1.4 | 1 | 2 | 1 |
| 4 | 2 | 2 | 2 | 4 | 2 |
| 8 | 3 | 2.8 | 3 | 8 | 3 |
| 16 | 4 | 4 | 4 | 16 | 4 |
| 32 | 5 | 5.6 | 5 | 32 | 5 |
| 64 | 6 | 8 | 6 | 64 | 6 |
| 128 | 7 | 11 | 7 | 128 | 7 |
| 256 | 8 | 16 | 8 | 256 | 8 |
| 512 | 9 | 22 | 9 | 512 | 9 |
| 1024 | 10 | 32 | 10 | 1024 | 10 |

The flow chart of the processes for obtaining the magnification $M_V$ is shown in FIGS. 9A through 9D.

As mentioned above, the value $f_V$ necessary for calculating the value $M_V$ is given by an approximate value of $\log_2 f$, which depends on the necessary precision of calculation of $f_V$. In the illustrated embodiment, the resolving power of $f_V$ is determined in view of the object brightness which is obtained by $\frac{1}{8}E_V$ step in an existing photography.

Figure 10:
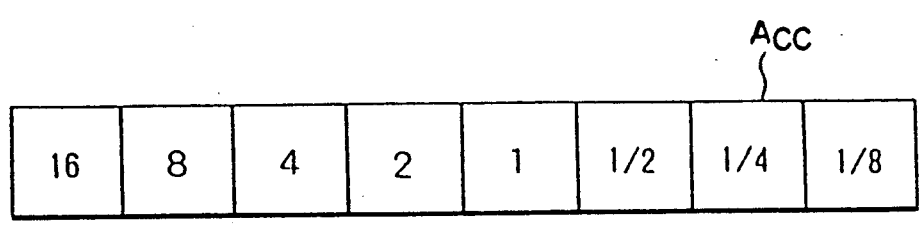
FIG. 10 is a schematic view of an accumulator $A_{cc}$ to detect $f_v$ to determine the magnification $M_v$.

Furthermore, the bit values of the accumulator $A_{CC}$ are weighted in the course of calculation of approximate value $\log_2 f$, as shown in FIG. 10.

The CPU 77 receives the data representing the focal length of the photographing lens which are stored in the lens ROM 19 into the EA register (step 201). As mentioned before, in case of a single focus photographing lens, the focal length data thereof are directly received, and in case of a zoom lens, data corresponding to the focal length modified in accordance with zooming are received. In the illustrated embodiment, since the focal length data are stored in the condensed form of 8-bit data in the lens ROM 10, as mentioned above, the data are modified into original integral numbers upon storage in the EA register of the CPU 77. The condensation and modification will be briefly explained below.

8-bit data stored in the lens ROM has a first bit group including two lower figures having weights of $2^2$ and $2^4$ and a second bit group including six higher figures having weights of $2^0$, $2^1$, $2^2$, $2^3$, $2^4$ and $2^5$ in the order from the lower figures to the higher figures. The modification into the integral numbers is effected by multiplying the sum of the bit values of the second bit group by the multiplication of the bit values of the first bit group, and then multiplying the resultant thus obtained by a predetermined constant.

After that, at step 203, whether the data of the six higher figures in the EA register, i.e. the data of the EAH register are 00H (H designates a hexadecimal number system) is checked to judge whether the focal length of the photographing lens in use is above or below $256(2^8)$ mm.

If EAH=00H at step 203, 08H is set in the B register, and the data of the EAL register are stored in the accumulator $A_{CC}$ (steps 205, 207). If EAH≠00H at step 203, 10H is set in the B register, and the data of the EAH register are stored in the accumulator $A_{CC}$ (steps 209, 211).

After that, the data of the B register is decreased by 1 (decrement), and the resultant is stored in the B register (step 213). The accumulator $A_{CC}$ is shifted by 1 bit in a direction toward a higher bit from a lower bit (step 215), and whether the carry (CY) of shift is 1 is checked at step 217. If CY is 0, the control is returned to step 213 and the processes of steps 213 and 215 are repeated util CY=1.

When CY=1, namely, when the highest figure bit stored in the EA register appears, a place corresponding to the highest figure bit is detected. The place is designated by the present value of the B registor. Thus, the approximate value of integer portion of $\log_2 f$ is obtained in the B register.

After that, to decimal portion ($\frac{1}{8}$ step) of the approximate value of $\log_2 f$, whether B<06H is checked at step 219. If the value of the B register is equal to or larger than 6, a value which is obtained by subtracting 6 from the value of the B register is stored in the C register (step 221). After that, the value of the EA registor is shifted by 1 bit in a direction (right hand direction) toward a lower bit from a higher bit at step 223, and then, the value which is obtained by subtracting 1 from the value of the C register is stored in the C register (step 225). If C≠0FFH, the control is returned to step 223, so that the processes of steps 223 and 225 are repeated until C=0FFH, i.e. until C=−1. When C=0FFH, namely, when the fifth bit as counted from the highest figure of the data representing the focal length which have been stored in the EA register is stored at the $0_{-th}$ bit of the EA register, 1 is added to the value of the EA register and the resultant is stored again in the EA register (steps 227 and 229).

After that, the value of the EA register is shifted by 'bit in the right hand direction. The shift results in the storage of the data of the $4_{-th}$ bit as counted from the highest figure of the data of the focal length which have been stored in the EA register (step 231). After that, 1 is added to the value of the EA register and the resultant is stored again in the EA register (step 233).

At steps 229 and 233, the addition of 1 to the value of the EA register modifies the places of $1.16E_V$ and $1/32E_V$, so that the calculation of the approximate value of $\log_2 f$ can be precisely effected. Note that the reason of the addition of 1 to the values of the 4th and 5th bits as counted from the highest figure of the data of the focal length is that the value of $T_{Vf}$ corresponding to $\frac{1}{8}$ step is obtained. If the resolving power of $f_V$ changes, the place of bit to which 1 is added changes.

After that, the value of the EA register is shifted by 1-bit in the right direction at step 235. As a result, the data corresponding to the decimal portion ($\frac{1}{8}$) of the resultant of the approximate calculation of $\log_2 f$ are stored at the 0~2nd bits of the EA register (exactly speaking, EAL register). The data of the three lower bits of the EA register, i.e. 0~2nd bits are stored in the accumulator $A_{CC}$ (step 237).

The integral portion of the approximate calculation result of $\log_2 f$ is datum stored in the B register, and accordingly the approximate calculation result of $\log_2 f$ can be obtained by a logical addition of the above-mentioned datum and datum corresponding to the decimal portion stored in the accumulator $A_{CC}$. To make a correspondence of place between the data of the B register and the data of the accumulator $A_{CC}$, the data of the B register are shifted by 3 bits in the left direction (step 239). After that, a logical sum is obtained (step 241). As a result, the approximate calculation result of $\log_2 f$ can be obtained.

If B(value of B register)<06H at step 219, whether B<05H is checked at step 251. If the value of the B register is equal to or larger than 5, the value of the B register is 5, so that the processes subsequent to step 229 are directly performed. On the contrary, if B<05H, whether B<04H is checked at step 253. If B≧04H, B is 4, so that the processes subsequent to step 233 are directly performed. As can be seen from the foregoing, if B is 5, the processes (steps 229, 233) for increasing the precision of the approximate calculation are performed, similarly to B being 6. When B is 4, 1 is added to the value of the 4th bit as reckoned from the highest figure of the data to increase the precision of the approximate calculation, similar to step 233.

If B<04H at step 253, the processes after step 237 are directly performed.

From the value of $\log_2 f$ obtained by the approximate calculation, the focal length $f_V$ can be obtained. The value of $f_V$ thus obtained is stored in a predetermined address of the RAM at step 243.

After that, the CPU 77 receives the position data of the movable lens, i.e. the object distance data which are stored in the RAM, for example into the accumulator $A_{CC}$ (step 245). In the illustrated embodiment, the electrical signals which are produced by the distance detecting portion 23 mentioned above) are set at the lower three bits as a variable value $D_{VX}$, and the inherent fixed value $D_{VM}$ of the photographing lens is set in the higher five bits. An APEX value of the object distance can be determined as follows by the variable value $D_{VX}$ and the fixed value $D_{VM}$.

At step 247, whether the fixed value $D_{VM}$ is larger than 4 is checked. If $D_{VM}$ is smaller than 4, the value of $D_V$ is obtained by subtracting 1 from the variable value $D_{VX}$ of the lower three bits at step 249. If $D_{VM}$ is equal to or larger than 4, the APEX value $D_V$ is given by $(D_{VX}+D_{VM}-4.5)$ at step 251. The APEX value $D_V$ is stored at a predetermined address of the RAM. After that, the calculation of $(D_V+1)/2$ is performed at steps 255 and 257.

The magnification $M_V$ is determined by the focal length $f_V$ and the APEX value $D_V$. When the result of $(D_V+1)/2$ obtained at step 257 is larger than 6·2/8, namely, when the movable lens is located at an infinite object distance, the magnification $M_V$ is fixed to $31 \cdot \frac{7}{8}$ (steps 259, 261). On the other hand, the result of $(D_V+1)/2$ obtained at step 257 is smaller than 6·2/8, the magnification $M_V$ is fixed to be $M_V=D_V/2-f_V+10$. The magnification $M_V$ thus obtained is stored at a predetermined address of the RAM at step 265.

⑥ Third Brightness Information Determining Means

The operation of the third brightness information determining means will be described below with reference to FIG. 5B.

At step 161 in FIG. 5B, if the exposure value $E_{VA}$ corresponding to the brightness obtained by the first sensor 45a is larger than the second predetermined brightness $\theta(=13$ in the embodiment), the value of the magnification $M_V$ is checked (steps 163, 165). If $E_{VA} \leq 13$, or $M_V$ does not satisfy $3 \cdot \frac{7}{8} < M_V < 8 \cdot \frac{1}{8}$, the brightness data $L_{VDA}$ obtained by the first sensor 45a is set to be the brightness information $L_{VD}$ for controlling the exposure (step 167). If $E_{VA} > 13$, and when $3 \cdot \frac{7}{8} < M_V < 8 \cdot \frac{1}{8}$, the magnification correcting value $C_1$ corresponding to the value $E_{VA}$ is obtained by the following equation.

$$C_1 = \omega(8-M_V)(E_{VA}-8)/32$$

wherein $\omega$ is a predetermined constant and is stored in the E²PROM 73a of the PCU 73. The value of $\omega$ can be optionally determined by a design.

Table 4 shows $\omega$ stored in the E²PROM 73a of the PCU 73. The 6-bits data (10H in the embodiment) represented by $\omega_2 \omega_1 x x x x$ determining the value of $\omega$ are stored in the E²PROM 73a of the PCU 73. The CPU 77 determines $\omega$ based on a combination of $\omega_2$ and $\omega_1$. The value of $\omega$ corresponding to the present data 10H is 1.0.

After that, at steps 171~173, and steps 175~179, the processes for increasing the precision are performed, in which the magnification correcting value C based on the magnification is determined, so that the exposure controlling value $L_{VD}$ which is obtained by subtracting the magnification correcting value C from the brightness information $L_{VDA}$ obtained by the output of the first sensor 45a (step 181). By the correction using the magnification $M_V$, as mentioned above, the drawback that the main object is detected to be brighter than a real brightness due to the brighter background can be eliminated. Namely, when the exposure value $E_{VA}$ based on the output of the first sensor 45a is large, the exposure is controlled based on the brightness information $L_{VD}$ which are corrected, taking the occupation ratio of the main object to the background in the center area 93a into consideration. On the other hand, when the exposure value $E_{VA}$ is small or when the main object is very small, so that the center area 93a is mainly occupied by the background, the exposure control is effected by the brightness information $L_{VDA}$ which is obtained by the output of the first sensor 45a.

⑦ Means for Correcting Outputs of Sensor

The multi-area brightness measuring apparatus according to the present invention has a correcting means of the outputs of the sensor to adjust the brightness $L_{VDA}$ obtained by the first sensor in accordance with the kind of the photographing lens in order to obtain a correct exposure value. This correcting means which is mainly constructed by the CPU 77 also detects the kind of the photographing lens being used.

Figure 11B:
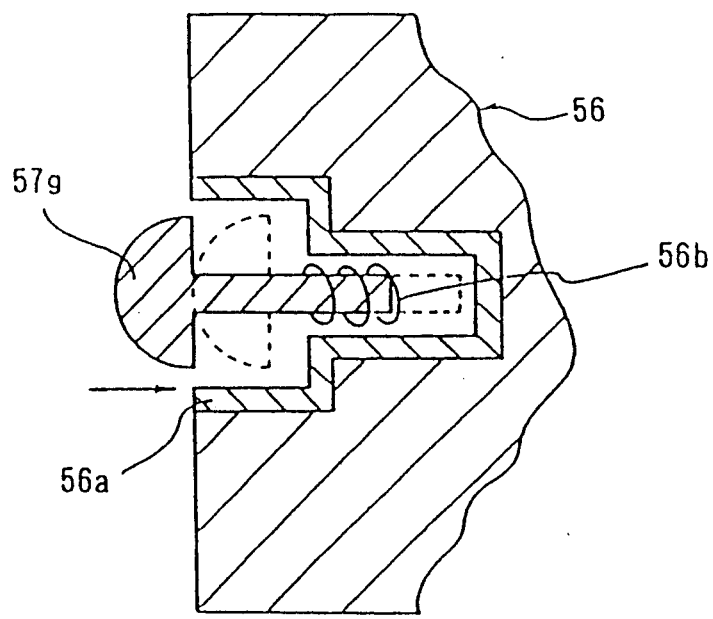
FIGS. 11A and 11B are front elevational view and sectional view of a camera for explaining how to correct the sensor outputs, according to the present invention, respectively; and, FIGS. 11C, 11D and 11E are front views of a sensor output correcting mechanism shown in FIGS. 11A and 11B.

The electrical contact group 57 is used as a part of sensor output means. FIG. 11A shows a plan view of a camera body 31 having the electrical contact groups 57. The camera body 31 has seven electrical contacts 57a~57g which are used to send and receive the signals to and from the photographing lens. In particular, the contact 57g is electrically insulated from the mount 56 through an insulator 56a and is normally projected from the mount surface of the mount 56 by a spring 59b, so that when the photographing lens is mounted, the contact 57g is retracted into the mount 56. The contact 57g which supplies the electrical power to the lens ROM of the photographing lens also checks whether the photographing lens has the lens ROM.

Examples of the photographing lenses are as follows.

Figure 11C:
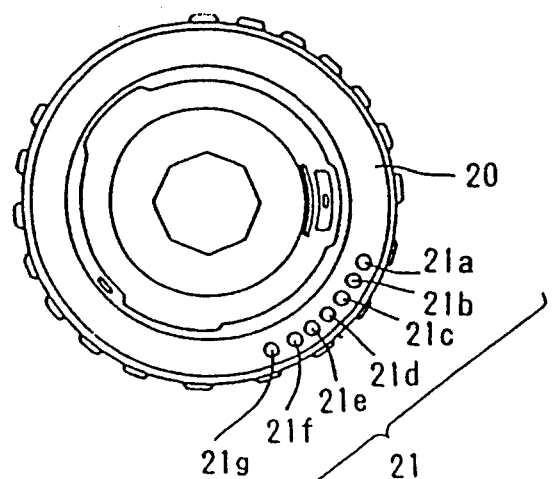
Figure 11D:
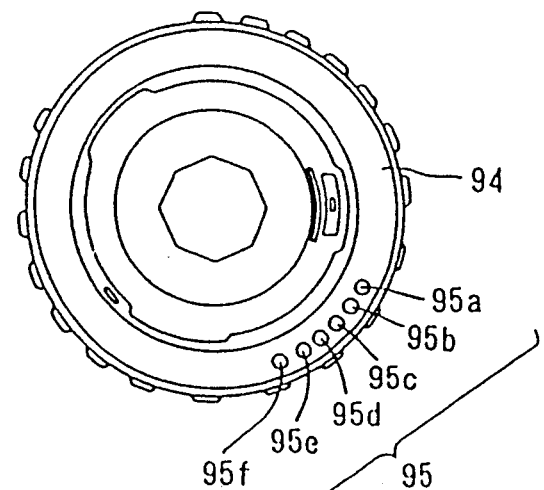
Figure 11E:
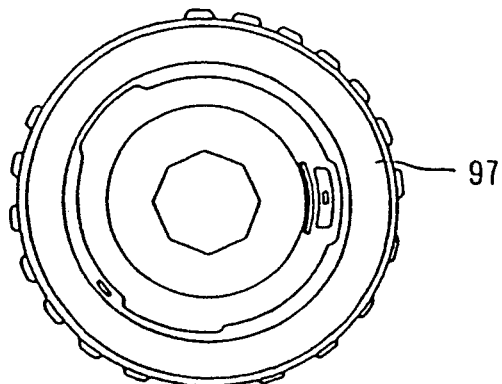

The first example is an auto-focusing photographing lens (which will be referred to as AF lens hereinafter) which has therein the lens ROM, as shown in FIGS. 2 and 8A. The second example is a photographing lens (which will be referred to as A-type lens hereinafter) which has no lens ROM, but can transmit information on whether the open aperture, the minimum aperture and the AE are manually or automatically controlled, to the camera body 31. The third example is a photographing lens (which will be referred to as M-type lens hereinafter) which has only a lens mount within a lens ROM and electrical contacts. FIG. 11C~11E show the mount portions of these photographing lenses.

The AF lens shown in FIG. 11C has a group of electrical contacts 21a~21g provided on the mount 20 to be electrically insulated therefrom. The electrical contact 21g corresponds to the electrical contact 57g of the camera body 31, so that the mounting of the AF lens to the camera body 31 can be detected by the contact 21g.

The A-type lens shown in FIG. 11D has a group of electrical contacts 95a~95g provided on the mount 94 to be electrically insulated therefrom. However, the A-type lens has no electrical contact corresponding to the electrical contact 57g provided on the camera body 31, and accordingly the contact 57g of the camera body 31 is brought into direct contact with the mount 94 of the A-type lens. Since the mount is grounded, the voltage level of the electrical contact 57g of the camera body 31 is "low". The camera body 31 detects that the A-type lens is mounted thereto when the voltage level of the contact 57g is low and when the remaining contacts have a predetermined voltage level. The arrangements of the electrical contacts of the camera body 31, the AF lens and the A-type lens are disclosed in detail for example in Japanese Patent Application No.

62-203,141 which was filed in the name of the assignee of the present application.

The M-type lens shown in FIG. 11E has no electrical contact, and accordingly when the M-type lens is mounted to the camera body 31, the electrical contacts 57a~57g of the camera body 31 come into direct contact with the mount 97 of the M-type lens which is grounded, so that the voltage level of all of the electrical contacts 57a~57g are "low". Thus, the mounting of the M-type lens to the camera body 31 can be detected.

When the AF lens is mounted to the camera body 31, the output of the sensor is corrected by the aperture correcting value $M_{NDIA}$ as mentioned before. After that, the above-mentioned processes at the follow light and back light and the process of the magnification are performed. However, when the photographing lens is the A-type lens or the M-type lens, since no lens ROM is provided, the correction of the brightness $B_{VA}$ in the center area in accordance with the kind of the photographing lens is effected as follows.

A-type Lens

When the voltage level of the contact 57g of the camera body 31 is low and when the remaining contacts 57a~57f are at a predetermined voltage level, the CPU 77 detects that the A-type lens is mounted to the camera body 31. In this case, the CPU 77 fetches the F number $A_{Vmin}$ represented by the three electrical contacts 95a, 95e and 95f of the A-type lens through the three contacts 57a, 57e and 57f of the camera body 31, and also fetches the predetermined constants P and Q from the predetermined address of the E$^2$PROM 73a of the PCU 73 to correct the value of $B_{VA}$ by the following equation.

$$B_{VA}=B_{VA1}-(A_{Vmin}-Q)\cdot P/8$$

wherein $B_{VA1}$ is the brightness information obtained by the first sensor 45a before correction.

Table 5 shows the values of P and Q, and the correcting values $C_M$ of output of the sensor when the M-type lens is mounted. In the E$^2$PROM 73a of the PCU 73 are stored P and Q, and 7-bit data represented by $C_3 C_2 C_1 Q_2 Q_1 P_2 P_1$ determining the $C_M$. The CPU 77 determines the values of P, Q and $C_M$ based on a combination of $P_1$ and $P_2$, a combination of $Q_1$ and $Q_2$, and a combination of $C_3 \sim C_1$, respectively. In the illustrated embodiment, since the inherent information of the lens (e.g. Vignetting) in the measuring area of the second sensor 45b can not be generated, no precise correction can be effected, and accordingly, no correction process is performed. However, it is also possible to correct the value of the output of the second sensor 45b.

M-type Lens

When the voltage level of all of the contacts 57a, 57b, 57c, 57d, 57e, 57f and 57g of the camera body 31 are low, the CPU 77 detects that the M-type lens is mounted to the camera body. In this case, the CPU 77 fetches the predetermined constant $C_M$ from the predetermined address of the E$^2$PROM 73a of the PCU 73 to correct the value of $B_{VA}$ in accordance with the following equation.

$$B_{VA}=B_{VA1}-C_M$$

wherein $B_{VA1}$ is the brightness information obtained by the first sensor 45a before correction.

Also, in this case, no correction of the output of the second sensor 45b is effected by the same reason as that of the A-type lens. However, it is also possible to correct the value of the output of the second sensor 45b.

As can be understood from the foregoing, since the divided brightness measuring apparatus according to the present invention can correct the output of the brightness measuring sensor in accordance with the kind of the photographing lens used, a precise exposure value can be obtained.

Note that no corrosion based on the magnification $M_V$ can be effected in the A-type lens and in the M-type lens, since neither the focal length of the photographing lens nor the object distance can be fetched in the CPU. Therefore, in case of the back light state and when the brightness of the center area is larger than the second predetermined brightness value, the brightness information $L_{VDA}$ obtained by the output of the first sensor 45a is used as the brightness data $L_{VD}$ for controlling the exposure value. The brightness information under the conditions other than those mentioned above can be determined in the similar way to the AF lens.

MODIFIED EMBODIMENT

The present invention is not limited to the illustrated and above-mentioned embodiments and can be modified without deviating from the spirit of the present invention.

Figure 9A:
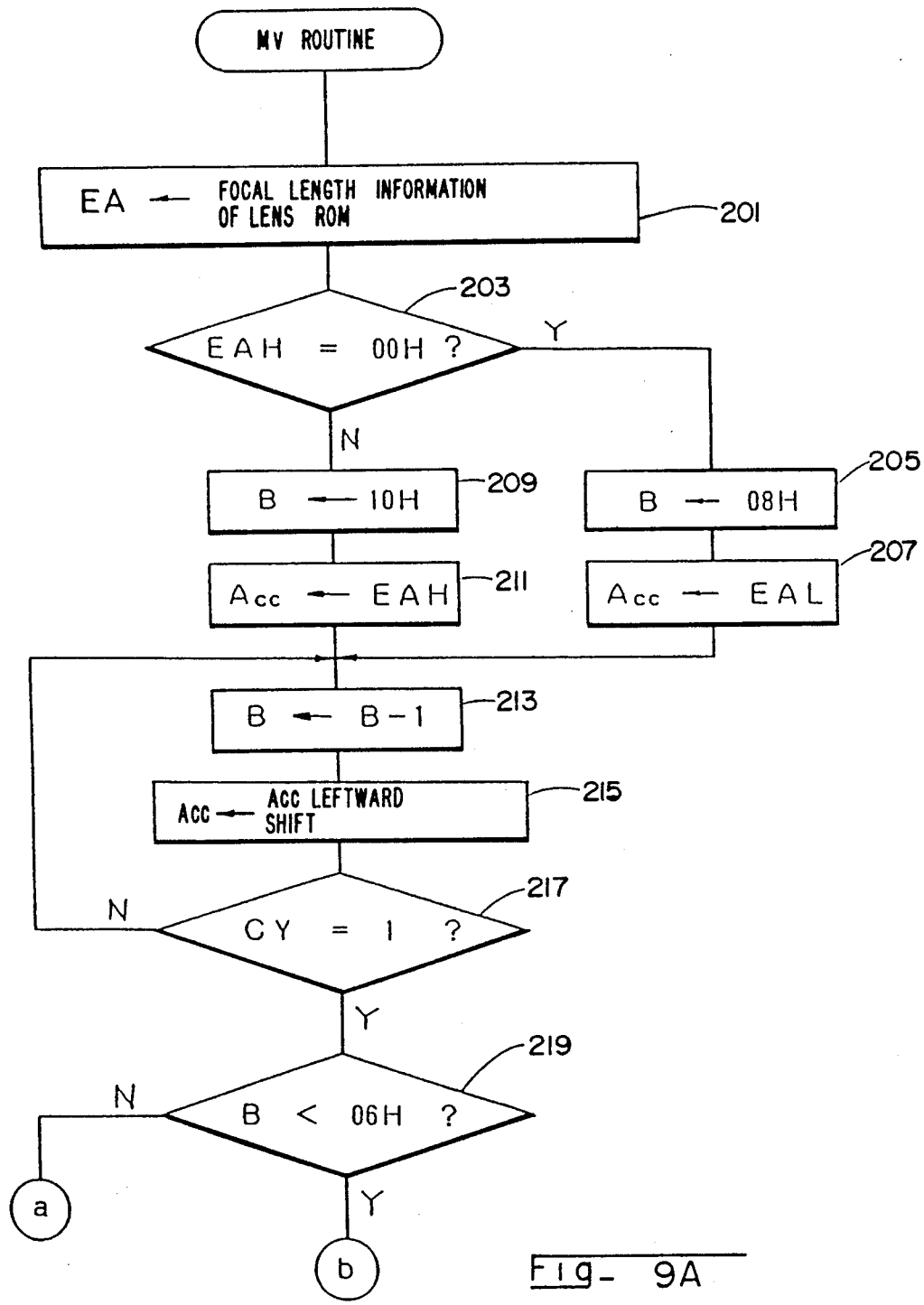
Figure 9B:
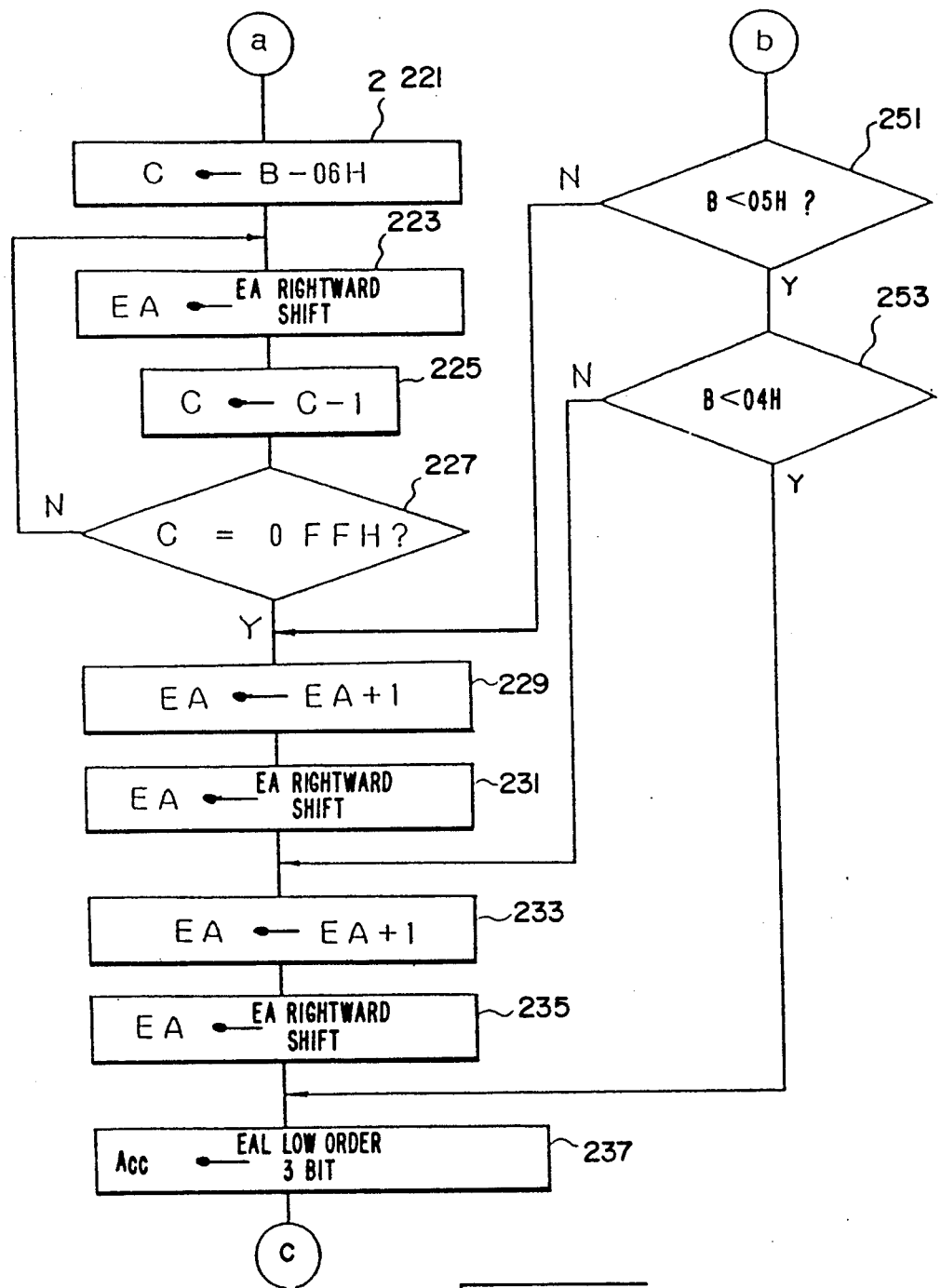
Figure 9C:
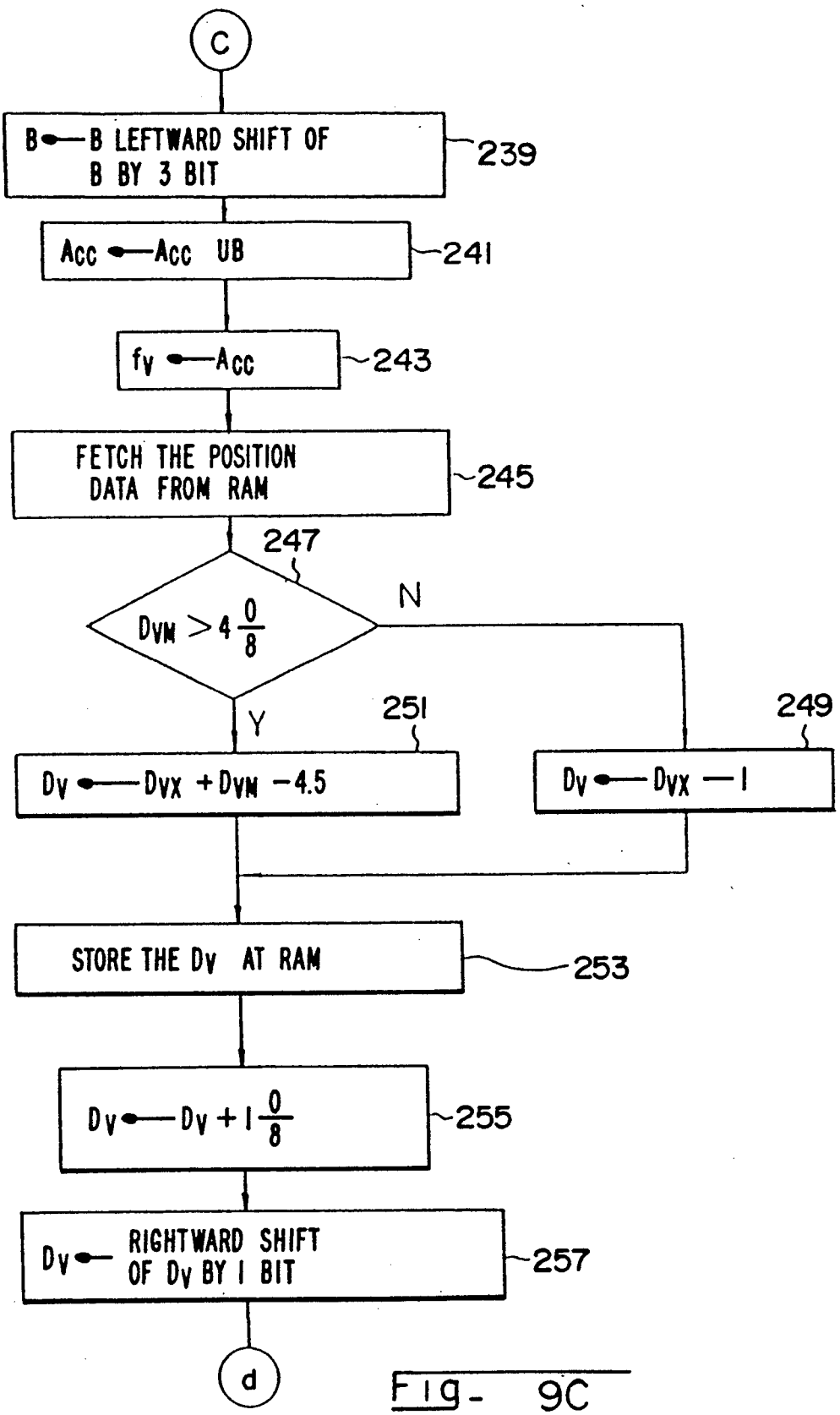

For instance, the process for obtaining the magnification $M_V$ is not limited to the flow chart shown in FIG. 9A. Furthermore, the processes of the first, second and third brightness information determining means are not limited to those illustrated and described above.

The shape of the light receiving element, the construction of the circuit for processing the photo-induced current, the construction of means for detecting the focal length of the photographing lens and the object distance are not limited to those mentioned above and can be modified.

Also, a camera to which the present invention can be applied is not limited to a specific camera. For instance, the present invention is applicable to an exchangeable lens type of camera having only the AE function, or an electronic still camera or the like.

As can be seen from the above discussion, according to the present invention, whether the object in the measuring area of the first sensor is in the follow light state or in the back light state is first checked. In case of follow light state, the brightness data can be gradually shifted from a means value of the brightness in the center area and the circumferential area toward the brightness of the darker circumferential area, as the brightness of the object in the center area increases. Consequently, an under-exposure of a picture can be prevented which would otherwise occur due to the brightness of the lighter center area. Note that when the brightness data obtained by the second sensor is used to control the exposure, no over-exposure takes place, since the brightness data are values shifted toward the larger brightness side.

On the contrary, in case of back light state, when the darkness of the object in the center area is relatively large, the brightness is used as the value of the brightness for controlling the exposure. When the brightness of the object in the center area is relatively small, a correcting value is added thereto to adjust the same. As a result, in case of back light state and when the center area is bright, a picture in which the small brightness has a priority can be obtained by the measurement of the brightness in the center area. On the other hand, when the center area is dark, a picture in which the large brightness has a priority can be obtained. Namely, a picture which is closer to the reality can be taken.

Furthermore, according to the present invention, in case of back light state, and in case where the brightness of the object in the center area of the measuring area is relatively high and a ratio of the surface area of the main object, such as a face of a human figure to a surface area of the center area is relatively large, the value which is obtained by subtracting a correcting value depending on the magnification $M_y$ from the detected brightness of the center area is used as a value of brightness for controlling the exposure, as mentioned before. Namely, the brightness of the center area which is increased in accordance with the brightness of the background can be compensated. Consequently, an underexposure of the main object can be prevented.

If there is no substantial difference in brightness between the first sensor and the second sensor, the exposure control can be effected by the measurement of the center area of the measuring area.

Since the output of the sensor can be adjusted in accordance with the F-number of the photographing lens, precise brightness information can be always obtained regardless of the kind of the photographing lens used.

Consequently, according to the present invention, the above-mentioned drawbacks of the reflection type of conventional brightness measuring apparatus can be eliminated, resulting in a realization of a simple and inexpensive multi-area brightness measuring apparatus in which the arithmetic processes can be easily performed.

TABLE 1

| Form of Data | | | | | | | | | |
|---|---|---|---|---|---|---|---|---|---|
| 6 | | | | | | | 0 | Present Data | |
| $\theta_3 \theta_2 \theta_1 \delta_2 \delta_1 \alpha_2 \alpha_1$ | | | | | | | | 59 H = 1011001 | |
| Relationships between data and standard value and between data and predetermined brightness | | | | | | | | | |
| $\theta_3$ | $\theta_2$ | $\theta_1$ | $\theta$ | $\delta_2$ | $\delta_1$ | $\delta$ | $\alpha_2$ | $\alpha_1$ | $\alpha$ |
| 0 | 0 | 0 | 8 | 0 | 0 | 4 | 0 | 0 | 1/8 |
| 0 | 0 | 1 | 9 | 0 | 1 | 5 | 0 | 1 | 2/8 |
| 0 | 1 | 0 | 10 | 1 | 0 | 6 | 1 | 0 | 3/8 |
| 0 | 1 | 1 | 11 | 1 | 1 | 7 | 1 | 1 | 4/8 |
| 1 | 0 | 0 | 12 | | | | | | |
| 1 | 0 | 1 | 13 | | | | | | |
| 1 | 1 | 0 | 14 | | | | | | |
| 1 | 1 | 1 | 15 | | | | | | |

The underlined values of $\alpha, \beta, \theta$ represent the values corresponding to present data 59 H.

TABLE 2

| Form of Data | | | |
|---|---|---|---|
| 6 | | 0 | Present Data |
| $\gamma_4 \gamma_3 \gamma_2 \gamma_1 \beta_3 \beta_2 \beta_1$ | | | 4 BH = 1001011 |
| $\beta_3$ | $\beta_2$ | $\beta_1$ | $\beta$ |
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

$\gamma$ is given by the following equation
$\gamma = 2^2 \gamma_4 + 2^1 \gamma_3 + 2^0 \gamma_2 + 2^{-1} \gamma_1$
For the present date 4 BH, $\gamma = 2^2 \times 1 + 2^{-1} \times 1 = 4.5$

TABLE 3

| Form of Data | | | |
|---|---|---|---|
| 6 | | 0 | Present Data |
| $\epsilon_4 \epsilon_3 \epsilon_2 \epsilon_1 \lambda_3 \lambda_2 \lambda_1$ | | | 63 H = 1100011 |
| Relationships between data and each constants | | | |
| $\lambda_3$ | $\lambda_2$ | $\lambda_1$ | $\lambda$ |
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

$\epsilon$ is given by the following equation
$\epsilon = 2^2 \epsilon_4 + 2^1 \epsilon_3 + 2^0 \epsilon_2 + 2^{-1} \epsilon_1$
For the present date 63 H, $\epsilon = 2^2 \times 1 + 2^1 \times 1 = 6$

TABLE 4

| Form of Data | | |
|---|---|---|
| 6 | 0 | Present Data |
| $\omega_2 \omega_1$ X X X X | | 10 H = 0010000 |
| Relationships between data and constant | | |
| $\omega_2$ | $\omega_1$ | $\omega$ |
| 0 | 0 | 0.5 |
| 0 | 1 | 1.0 |
| 1 | 0 | 1.5 |
| 1 | 1 | 2.0 |

The underlined values of $\omega$ represent the values corresponding to present data 10 H.

TABLE 5

| Form of Data | | | | | | | | | |
|---|---|---|---|---|---|---|---|---|---|
| 6 | | | | | | | | | 0 |
| $C_3 C_2 C_1 Q_2 Q_1 P_2 P_1$ | | | | | | | | | |
| Relationship between data and each correcting value | | | | | | | | | |
| $C_3$ | $C_2$ | $C_1$ | $C_M$ | $Q_2$ | $Q_1$ | $Q$ | $P_2$ | $P_1$ | $P$ |
| 0 | 0 | 0 | 0 | 0 | 0 | 0.5 | 0 | 0 | 0 |
| 0 | 0 | 1 | 1/8 | 0 | 1 | 1.0 | 0 | 1 | 1 |
| 0 | 1 | 0 | 2/8 | 1 | 0 | 1.5 | 1 | 0 | 2 |
| 0 | 1 | 1 | 3/8 | 1 | 1 | 2.0 | 1 | 1 | 3 |
| 1 | 0 | 0 | 4/8 | | | | | | |
| 1 | 0 | 1 | 5/8 | | | | | | |
| 1 | 1 | 0 | 6/8 | | | | | | |
| 1 | 1 | 1 | 7/8 | | | | | | |

We claim:

1. A multi-area brightness measuring apparatus of a camera comprising a first brightness measuring sensor which detects a brightness of a center area of a photographing area;

a second brightness measuring sensor which detects a brightness of a circumferential area surrounding the center area;

detecting means for detecting whether the object in the center area is in follow light state or back light state, based on the outputs of the first and second brightness measuring sensors;

first brightness information determining means which operates when the detecting means detects the follow light state to generate an output of a brightness value which is obtained by subtracting a predetermined follow light correcting value corresponding to a brightness value obtained by the output of the first brightness measuring sensor from the brightness value obtained by the output of the first brightness measuring sensor; and, second brightness information determining means which operates when the detecting means detects the back light state and when a brightness value obtained by the output of the first brightness measuring sensor is below a first predetermined reference brightness value to generate an output of a brightness value which is obtained by adding a predetermined back light correcting value corresponding to the brightness value obtained by the output of the first brightness measuring sensor to the brightness value obtained by the output of the first brightness measuring sensor.

2. A multi-area brightness measuring apparatus according to claim 1, wherein said detecting means detects the follow light state when a brightness value which is obtained by subtracting the brightness value obtained by the second brightness measuring sensor from the brightness value obtained by the first brightness measuring sensor is above a predetermined positive value, and detects the back light state when the subtracted value is below a predetermined negative value.

3. A multi-area brightness measuring apparatus according to claim 1, wherein said first brightness information determining means outputs, as brightness data, the brightness value obtained by the first brightness measuring sensor when the detecting means detects neither the follow light state nor the back light state.

4. A multi-area brightness measuring apparatus according to claim 1, wherein said first brightness information determining means determines the follow light correcting value to be half a difference of the brightness value obtained by the first brightness measuring sensor and the brightness value obtained by the second brightness measuring sensor, when the brightness value obtained by the first brightness measuring means is below a predetermined value.

5. A multi-area brightness measuring apparatus according to claim 1, wherein the follow light correcting value determined by the first brightness information determining means increases as the brightness value obtained by the first brightness measuring means which is above a predetermined value increases.

6. A multi-are brightness measuring apparatus according to claim 1, wherein said second brightness information determining means determines the maximum values of the follow light correcting value and the back light correcting value to be a difference in brightness value between the first brightness measuring sensor and the second brightness measuring sensor.

7. A multi-are brightness measuring apparatus according to claim 1, wherein said second brightness information determining means determines the maximum values of the follow light correcting value and the back light correcting value to be a predetermined maximum correcting value when a difference in brightness value between the first brightness measuring sensor and the second brightness measuring sensor is above the predetermined maximum correcting value.

8. A multi-area brightness measuring apparatus according to claim 1, wherein said detecting means, said first brightness information determining means and said second brightness information determining means are constructed by a same CPU.

9. A multi-area brightness measuring apparatus according to claim 1, further comprising a third brightness information determining means which operates when the detecting means detects the back light state and when a brightness value obtained by the output of the first brightness measuring sensor is below a first predetermined reference brightness value to output, as the brightness data, a brightness value which is obtained by subtracting a magnification correcting value corresponding to a magnification which is obtained by the focal length of a photographing lens and an object distance of the object in said center area from the brightness value obtained by the output of the first brightness measuring sensor when the magnification is within a predetermined range.

10. A multi-area brightness measuring apparatus according to claim 9, wherein said detecting means detects the follow light state when a brightness value which is obtained by subtracting the brightness value obtained by the second brightness measuring sensor from the brightness value obtained by the first brightness measuring sensor is above a predetermined positive value, and detects the back light state when the subtracted value is below a predetermined negative value.

11. A multi-area brightness measuring apparatus according to claim 9, wherein said first brightness information determining means outputs, as brightness data, the brightness value obtained by the first brightness measuring sensor when the detecting means detects neither the follow light state nor the back light state.

12. A multi-area brightness measuring apparatus according to claim 9, wherein said first brightness information determining means determines the follow light correcting value to be half a difference of the brightness value obtained by the first brightness measuring sensor and the brightness value obtained by the second brightness measuring sensor, when the brightness value obtained by the first brightness measuring means is below a predetermined value.

13. A multi-area brightness measuring apparatus according to claim 9, wherein the follow light correcting value determined by the first brightness information determining means increases as the brightness value obtained by the first brightness measuring means which is above a predetermined value increases.

14. A multi-area brightness measuring apparatus according to claim 9, wherein said second brightness information determining means determines the maximum values of the follow light correcting value and the back light correcting value to be a difference brightness value between the first brightness measuring sensor and the second brightness measuring sensor.

15. A multi-area brightness measuring apparatus according to claim 9, wherein said second brightness information determining means determines the maximum values of the follow light correcting value and the back light correcting value to be a determined maximum correcting value when a difference in brightness value between the first brightness measuring sensor and the second brightness measuring sensor is above the predetermined maximum correcting value.

16. A multi-area brightness measuring apparatus according to claim 9, wherein said magnification within a predetermined range includes $X/2^9$ magnification, wherein X represent a size (mm) in an image plane of a light receiving area of the first brightness information measuring sensor.

17. A multi-area brightness measuring apparatus according to claim 9, wherein supposing that the exposure value based on the brightness value obtained by the output of the first brightness measuring sensor is $E_{va}$, the magnification $M_v$ and the magnification correcting value C corresponding to the magnification are given by the following equations:

$$M_v = D_v/2 - f_v + 10$$

$$C = \omega(M_v - 8)(E_{va} - 8)/32$$

wherein $\omega$=constant, $D_v = 2\log_2 D$ and $f_v = \log_2 f$, [wherein D is an object distance (m) and f is a focal length (mm)].

18. A multi-area brightness measuring apparatus according to claim 9, further comprising a lens correcting means for correcting the brightness obtained by the output of the first brightness measuring sensor in accordance with the kind of the photographing lens used.

19. A multi-area brightness measuring apparatus according to claim 9, wherein it is mounted to a camera body in which the photographing lens can be detachably attached.

20. A multi-area brightness measuring apparatus according to claim 19, wherein data of the focal length are input to said third brightness information determining means from the photographing lens mounted to the camera body.

21. A multi-area brightness measuring apparatus according to claim 19, wherein said photographing lens comprises a memory in which at least focal length information is stored.

22. A multi-area brightness measuring apparatus according to claim 21, wherein the camera body has a body mount which is provided a group of electrical contacts and wherein said photographing lens has a mount which is provided with a group of electrical contacts which are brought into contact with the electrical contacts of the body mount, so that the focal length information stored in the memory can be input to the third brightness information determining means through the groups of the electrical contacts.

23. A multi-area brightness measuring apparatus according to claim 22, wherein said camera has at least one movable lens which is movable in the optical axis directions to adjust the focal length.

24. A multi-area brightness measuring apparatus according to claim 23, wherein the photographing lens comprises a zoom code plate on which the position of the movable lens is coded, a brush which comes into slide contact with the zoom code plate, and a memory in which data of focal length corresponding to the coded information of the code plate representing the contact position of the brush with the zoom code plate are stored.

25. A multi-area brightness measuring apparatus according to claim 24, wherein the focal length data stored in the memory corresponding to the code information are supplied to the first brightness information determining means or the lens correcting means through the group of electrical contacts.

26. A multi-area brightness measuring apparatus according to claim 24, further comprising detecting means for detecting the kind of the photographing lens mounted to the camera body.

27. A multi-area brightness measuring apparatus according to claim 26, further comprising a correcting means for correcting the brightness value obtained by the output of the first brightness measuring sensor, in accordance with the kind of the photographing lens detected by the detecting means.

28. A multi-area brightness measuring apparatus according to claim 27, wherein when said detecting means detects that the photographing lens has the group of the electrical contacts corresponding to the electrical contacts of the camera body and the memory in which at least the focal length information are stored, the information of the memory are supplied to the detecting means for detecting the follow light state and the back light state and the brightness information determining means through the electrical contacts, so that the follow light correction, the back light correction and/or magnification correction can be effected.

29. A multi-area brightness measuring apparatus according to claim 28, wherein said detecting means for detecting the follow light state and the back light state, the first brightness information determining means, the second brightness information determining means, the third brightness information determining means, and the detecting means for detecting the kind of the photographing lens are constituted by a same CPU.

30. A multi-area brightness measuring apparatus of a camera comprising a first brightness measuring sensor which detects a brightness of a center area of a photographing area;

a second brightness measuring sensor which detects a brightness of a circumferential area surrounding the center area;

detecting means for detecting whether the object in the center area is in follow light state of back light state, based on the outputs of the first and second brightness measuring sensors; and, brightness information determining means which operates when the detecting means detects the back light state and which corrects the outputs of the first brightness measuring sensor and the second brightness measuring sensor in accordance with a magnification which is obtained by the focal length of a photographing lens and an object distance of the object in said center area.

31. A multi-area brightness measuring apparatus according to claim 30, further comprising an additional brightness information determining means which determines the maximum values of the follow light correcting value and the back light correcting value to be a predetermined maximum correcting value when a difference in brightness value between the first brightness measuring sensor and the second brightness measuring sensor is above the predetermined maximum correcting value.

32. A multi-area brightness measuring apparatus according to claim 30, wherein said magnification within a predetermined range includes $X/2^9$ magnification, wherein X represents a size (mm) in an image plane of a light receiving area of the first brightness information measuring sensor.

33. A multi-area brightness measuring apparatus according to claim 30, wherein supposing that the exposure value based on the brightness value obtained by the output of the first brightness measuring sensor is $E_{va}$, the magnification $M_v$ and the magnification correcting value C corresponding to the magnification are given by the following equations:

$$M_v = D_v/2 - f_v + 10$$

$$C = \omega(M_v - 8)(E_{va} - 8)/32$$

wherein $\omega$=constant, $D_v = 2\log_2 D$ and $f_v = \log_2 f$, [wherein D is an object distance (m) and f is a focal length (mm)].

34. A multi-area brightness measuring apparatus according to claim 30, further comprising a lens correcting means for correcting the brightness obtained by the output of the first brightness measuring sensor in accordance with the kind of the photographing lens used.

35. A multi-area brightness measuring apparatus according to claim 30, wherein it is mounted to a camera body in which the photographing lens can be detachably attached.

36. A multi-area brightness measuring apparatus according to claim 35, wherein said photographing lens comprises a memory in which at least focal length information is stored.

37. A multi-area brightness measuring apparatus according to claim 36, wherein the camera body has a body mount which is provided a group of electrical contacts and wherein said photographing lens has a mount which is provided with a group of electrical contacts which are brought into contact with the electrical contacts of the body mount, so that the focal length information stored in the memory can be input to the third brightness information determining means through the groups of the electrical contacts.

38. A multi-area brightness measuring apparatus according to claim 37, wherein said camera has at least one movable lens which is movable in the optical axis directions to adjust the focal length.

39. A multi-area brightness measuring apparatus according to claim 38, wherein the photographing lens comprises a zoom code plate on which the position of the movable lens is coded, a brush which comes into slide contact with the zoom code plate, and a memory in which data of focal length corresponding to the coded information of the code plate representing the contact position of the brush with the zoom code plate are stored.

40. A multi-area brightness measuring apparatus according to claim 39, wherein the focal length data stored in the memory corresponding to the code information are supplied to the first brightness information determining means or the lens correcting means through the groups of electrical contacts.

41. A multi-area brightness measuring apparatus according to claim 40, further comprising detecting means for detecting the kind of the photographing lens mounted to the camera body.

42. A multi-area brightness measuring apparatus according to claim 41, further comprising a correcting means for correcting the brightness value obtained by the output of the first brightness measuring sensor, in accordance with the kind of the photographing lens detected by the detecting means.

43. A multi-area brightness measuring apparatus according to claim 42, wherein when said detecting means detects that the photographing lens has the group of the electrical contacts corresponding to the electrical contacts of the camera body and the memory in which at least the focal length information are stored, the information of the memory are supplied to the detecting means for detecting the follow light state and the back light state and the brightness information determining means through the electrical contacts, so that the follow light correction, the back light correction and/or magnification correction can be effected.

44. A multi-area brightness measuring apparatus according to claim 43, wherein said detecting means for detecting the follow light state and the back light state, the first brightness information determining means, said additional brightness information determining means, and the detecting means for detecting the kind of the photographing lens are constituted by a same CPU.

* * * * *